(12) United States Patent
Ohtaki et al.

(10) Patent No.: US 7,820,263 B2
(45) Date of Patent: *Oct. 26, 2010

(54) VOLUME HOLOGRAM LAMINATE

(75) Inventors: Hiroyuki Ohtaki, Shinjuku-Ku (JP); Kenji Ueda, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 115 days.

This patent is subject to a terminal disclaimer.

(21) Appl. No.: 10/918,473

(22) Filed: Aug. 16, 2004

(65) Prior Publication Data

US 2005/0013959 A1 Jan. 20, 2005

Related U.S. Application Data

(63) Continuation of application No. 10/102,940, filed on Aug. 16, 2004, now Pat. No. 6,805,934, which is a continuation of application No. 09/288,572, filed on Apr. 9, 1999, now Pat. No. 6,432,498.

(30) Foreign Application Priority Data

| Apr. 10, 1998 | (JP) | ............................... 1998-99413 |
| Apr. 10, 1998 | (JP) | ............................... 1998-99414 |
| Apr. 10, 1998 | (JP) | ............................... 1998-99415 |
| Nov. 27, 1998 | (JP) | ............................... 1998-337762 |

(51) Int. Cl.
 *G03H 1/04* (2006.01)
(52) U.S. Cl. .................... 428/40.1; 428/41.8; 428/41.9; 428/42.1; 430/1; 430/2; 359/3
(58) Field of Classification Search ............... 428/40.1, 428/41.8, 41.9, 421, 354, 42.1; 430/1, 2; 359/3
See application file for complete search history.

(56) References Cited

U.S. PATENT DOCUMENTS 3,941,904 A * 3/1976 Hoh et al. ................ 427/208.2

(Continued)

FOREIGN PATENT DOCUMENTS

EP    0 363 171 A2    4/1990

(Continued)

OTHER PUBLICATIONS

Translation of JP 07-089226.*

*Primary Examiner*—Alicia Chevalier
(74) *Attorney, Agent, or Firm*—Oliff & Berridge, PLC

(57) ABSTRACT

The present invention relates to a volume hologram laminate with low generation of spotty hologram flaws in the volume hologram layer even when kept under pressurized conditions during storage, and to a volume hologram laminate-fabricating label. The volume hologram laminate 1 of the invention has a first adhesive layer 3, a volume hologram layer 5, a second adhesive layer 4 and a surface protective film 6 formed in that order on a substrate 1, wherein the volume hologram layer is a hologram recording in a recording material comprising a matrix polymer and a photopolymerizable compound, having a glass transition point of 30° C.-70° C. and a dynamic storage elastic modulus of $5 \times 10^5$ Pa-$5 \times 10^7$ Pa at 50° C. when measured at 6.28 rad/s, and the second adhesive layer has a dynamic storage elastic modulus of no greater than $5 \times 10^4$ Pa or at least $2.5 \times 10^5$ Pa at 50° C. when measured at 6.28 rad/s.

10 Claims, 8 Drawing Sheets

U.S. PATENT DOCUMENTS

| | | | | |
|---|---|---|---|---|
| 4,856,857 | A | 8/1989 | Takeuchi et al. | 350/3.6 |
| 4,908,285 | A * | 3/1990 | Kushibiki et al. | 430/1 |
| 5,282,066 | A | 1/1994 | Yu et al. | 359/3 |
| 5,318,816 | A | 6/1994 | Yin et al. | 428/40 |
| 5,360,501 | A | 11/1994 | Bolt | 156/101 |
| 6,432,498 | B1 * | 8/2002 | Ohtaki et al. | 428/40.1 |
| 6,805,934 | B2 * | 10/2004 | Ohtaki et al. | 428/40.1 |

FOREIGN PATENT DOCUMENTS

| | | |
|---|---|---|
| EP | 0 419 241 A2 | 3/1991 |
| EP | 0 869 408 A1 | 10/1998 |
| JP | 07-089226 * | 4/1995 |
| WO | WO 96/19543 | 6/1996 |
| WO | WO 98/12607 | 3/1998 |

* cited by examiner

VOLUME HOLOGRAM LAMINATE

This is a Continuation of application Ser. No. 10/102,940 filed Mar. 22, 2002, now allowed, which in turn is a continuation of Ser. No. 09/288,572 filed Apr. 9, 1999, now U.S. Pat. No. 6,432,498 issued Aug. 13, 2002.

BACKGROUND OF THE INVENTION

1. Field of the Invention

The present invention relates to a volume hologram laminate which can reduce spotty hologram flaws produced by stacking or by storage under pressure during transport or warehousing, and to a label for fabrication of a volume hologram laminate.

2. Description of the Related Art

Volume hologram laminates developed in the past have generally had a construction wherein an adhesive layer, a volume hologram layer, an adhesive layer and a transparent protective film are laminated in that order on a substrate, the substrate for the adhesion being of various forms such as examination admission tickets, ID cards, small booklets such as passports and so forth; however, in the case of dry volume phase-type hologram recording materials wherein the hologram recording material is a recording material comprising a matrix polymer and a photopolymerizable compound, a problem is presented by spotty hologram flaws which occur during stacking for transport or warehousing or storage under a state of pressure, as in the case of books, for example.

Such spotty hologram flaws become apparent by observing the hologram recording layer, and the spots are oval-shaped with a long axis of 0.2-2 mm and a short axis of 0.1-1.5 mm, approximately, or circular with a radius of about 0.1-2 mm, occurring in a regular arrangement. Because this type of hologram flaw depends on the light source and the angle from which it is viewed, it can be considered a holographic flaw instead of contamination by air bubbles or foreign matter in the volume hologram layer.

It is an object of the present invention to provide a volume hologram laminate free of such hologram flaws and a label for fabrication of the volume hologram laminate, and it is a further object to provide a volume hologram laminate with low occurrence of spotty hologram flaws in the volume hologram layer even when kept under a state of pressure during storage, etc., as well as a label for fabrication of the volume hologram laminate.

DISCLOSURE OF THE INVENTION

First Invention

The first invention includes the following aspects. The volume hologram laminate according to the first aspect is a volume hologram laminate having a first adhesive layer, a volume hologram layer, a second adhesive layer and a surface protective film formed in that order on a substrate, characterized in that the volume hologram layer is a hologram recording in a recording material comprising a matrix polymer and a photopolymerizable compound, having a glass transition point of 30° C.-70° C. and a dynamic storage elastic modulus of $5 \times 10^5$ Pa-$5 \times 10^7$ Pa at 50° C. when measured at 6.28 rad/s, and the second adhesive layer has a dynamic storage elastic modulus of no greater than $5 \times 10^4$ Pa or at least $2.5 \times 10^5$ Pa at 50° C. when measured at 6.28 rad/s.

The volume hologram laminate-fabricating label according to the second aspect of the invention is characterized in that a first adhesive layer, a volume hologram layer, a second adhesive layer and a surface protective film are formed in that order on a peel sheet, the volume hologram layer is a hologram recording in a recording material comprising a matrix polymer and a photopolymerizable compound, having a glass transition point of 30° C.-70° C. and a dynamic storage elastic modulus of $5 \times 10^5$ Pa-$5 \times 10^7$ Pa at 50° C. when measured at 6.28 rad/s, and the second adhesive layer has a dynamic storage elastic modulus of no greater than $5 \times 10^4$ Pa or at least $2.5 \times 10^5$ Pa at 50° C. when measured at 6.28 rad/s.

It is preferred for the half-width of diffraction light (half-bandwidth of diffraction light) in a volume hologram recorded in the volume hologram layer of the volume hologram laminate or volume hologram laminate-fabricating label to be no greater than 30 nm.

The present invention has been completed upon determining that hologram flaws in volume hologram laminates are generated substrated on a correlation between the hardness of the volume hologram layer and the hardness of the adhesive layer formed between the volume hologram layer and the surface protective film.

Second Invention

The second invention includes the following aspects. The volume hologram laminate according to the first aspect is a volume hologram laminate having a first adhesive layer, a volume hologram layer, a second adhesive layer and a surface protective film formed in that order on a substrate, characterized in that the volume hologram layer is a hologram recording in a recording material comprising a matrix polymer and a photopolymerizable compound, having a glass transition point of 30° C.-70° C. and a dynamic storage elastic modulus of $5 \times 10^5$ Pa-$5 \times 10^7$ Pa at 50° C. when measured at 6.28 rad/s, and the second adhesive layer has a loss tangent (tan δ), as represented by the dynamic loss elastic modulus/dynamic storage elastic modulus for the frequency dependent property at $10^{-1}$ rad/s-10 rad/s, which increases with lower frequency.

The volume hologram laminate-fabricating label according to the second aspect of the invention is characterized in that a first adhesive layer, a volume hologram layer, a second adhesive layer and a surface protective film are formed in that order on the substrate, the volume hologram layer is a hologram recording in a recording material comprising a matrix polymer and a photopolymerizable compound, having a glass transition point of 30° C.-70° C. and a dynamic storage elastic modulus of $5 \times 10^5$ Pa-$5 \times 10^7$ Pa at 50° C. when measured at 6.28 rad/s, and the second adhesive layer has a loss tangent (tan δ), as represented by the dynamic loss elastic modulus/dynamic storage elastic modulus for the frequency dependent property at $10^{-1}$ rad/s-10 rad/s, which increases with lower frequency.

It is preferred for the half-width of diffraction light in a volume hologram recorded in the volume hologram layer of the volume hologram laminate or volume hologram laminate-fabricating label to be no greater than 30 nm.

Third Invention

The third invention includes the following aspects. The volume hologram laminate according to the first aspect is a volume hologram laminate having a first adhesive layer, a volume hologram layer, a second adhesive layer and a surface protective film formed in that order on a substrate, characterized in that the volume hologram layer is a hologram recording in a recording material comprising a matrix polymer and a photopolymerizable compound, having a glass transition point of 30° C.-70° C. and a dynamic storage elastic modulus of $5\times10^5$ Pa-$5\times10^7$ Pa at 50° C. when measured at 6.28 rad/s, and the second adhesive layer has a maximum logarithmic decrement of less than 1 or at least 2 according to surface viscoelastic measurement by a pendulum type rigidity test.

The volume hologram laminate-fabricating label according to the second aspect of the invention is characterized in that a first adhesive layer, a volume hologram layer, a second adhesive layer and a surface protective film are formed in that order on a peel sheet, the volume hologram layer is a hologram recording in a recording material comprising a matrix polymer and a photopolymerizable compound, having a glass transition point of 30° C.-70° C. and a dynamic storage elastic modulus of $5\times10^5$ Pa-$5\times10^7$ Pa at 50° C. when measured at 6.28 rad/s, and the second adhesive layer has a maximum logarithmic decrement of less than 1 or at least 2 according to surface viscoelastic measurement by a pendulum type rigidity test.

It is preferred for the half-width of diffraction light in the volume hologram recorded in the volume hologram layer of the volume hologram laminate or volume hologram laminate-fabricating label to be no greater than 30 nm.

The present invention has been completed upon determining that hologram flaws in volume hologram laminates are generated substrated on a correlation between the hardness of the volume hologram layer and the hardness of the adhesive layer formed between the volume hologram layer and the surface protective film.

Fourth Invention

The fourth invention relates to a volume-type hologram laminate characterized in that a transparent protective film is formed on the surface of a hologram layer via a transparent hot-melt adhesive layer.

The present invention has been completed upon determining that hologram flaws in volume-type hologram laminates are generated substrated on a correlation between the hardness of the volume-type hologram layer and the hardness of the adhesive layer formed between the volume-type hologram layer and the transparent protective film, and that such problems can be overcome by using as the adhesive a hot-melt adhesive which is solid up to a given temperature.

DETAILED DESCRIPTION OF THE INVENTION

First Invention

Figure 1:
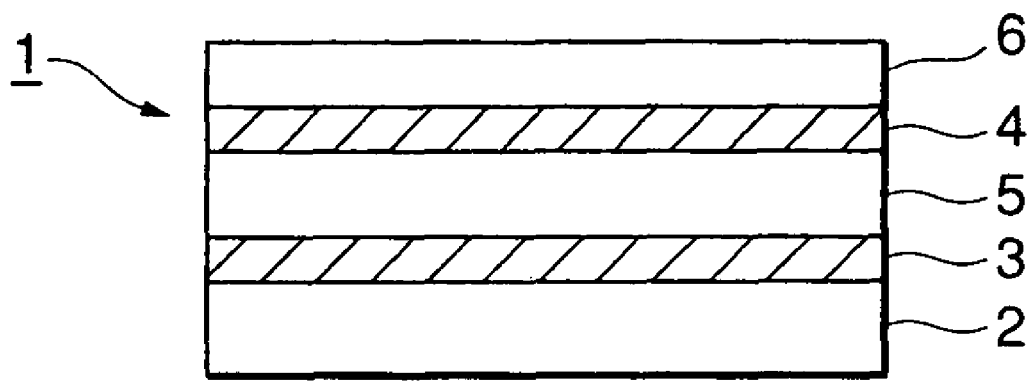
FIG. 1, FIG. 2, FIG. 5, FIG. 6, FIG. 9, FIG. 10 and FIGS. 13-16 are cross-sectional views of volume hologram laminates or laminate-fabricating labels according to the present invention.
Figure 2:
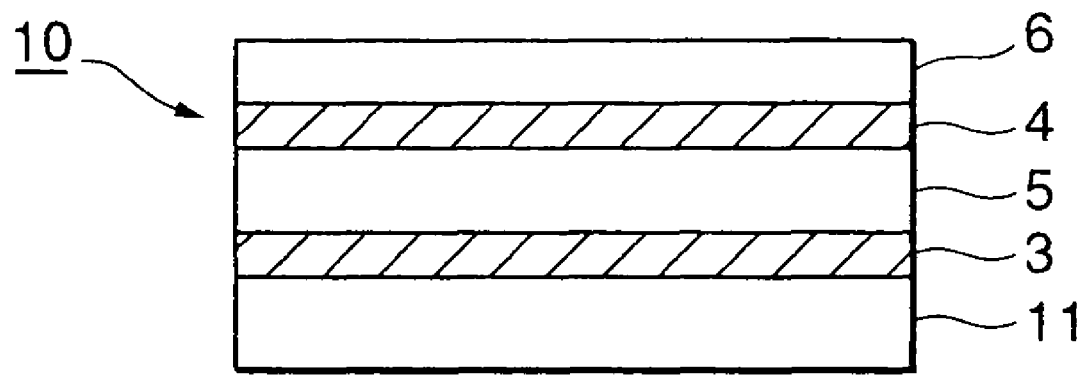

A volume hologram laminate according to the invention is shown cross-sectionally in FIG. 1. Here, 1 is the volume hologram laminate, 2 is a substrate, 3 is a first adhesive layer, 4 is a second adhesive layer, 5 is a volume hologram layer and 6 is a surface protective film.

The substrate 2 of the volume hologram laminate of the invention can be a film or sheet made of paper, synthetic paper, synthetic resin or metal, and may be in various forms including that of a sheet such as an examination admission ticket, that of a card such as an ID card, or that of a small booklet such as a passport; the substrate will have attached thereto a volume hologram bearing a facial photograph or background which has been hologram-recorded in monochrome or full color. When used as a color filter for a liquid crystal display element, a glass panel or electrode layer will serve as the substrate in a liquid crystal cell.

The volume hologram laminate of the invention is shown in FIG. 1 as having a construction wherein the volume hologram layer 5 is laminated on the substrate 2 via the first adhesive layer 3, but it may also have a construction wherein the volume hologram layer 5 is laminated on the substrate 2 via double-sided adhesive tape, in which case it may have the first adhesive layer 3, the volume hologram layer 5, the second adhesive layer 4 and the surface protective film 6 laminated in that order on the substrate 2, via an adhesive layer and a plastic film such as a transparent or colored polyethylene terephthalate film.

The volume hologram layer 5 can be easily fabricated by coating a support film with a volume hologram recording material and then recording in the layer an interference pattern corresponding to the wavefront of light from an object by transmittivity modulation or refractivity modulation, or for reproduction, by joining with a volume hologram plate and developing by exposure to light.

The volume hologram layer 5 is a photosensitive material for volume phase-type hologram recording with dry processing which comprises a matrix polymer, a photopolymerizable compound, a photopolymerization initiator, a sensitizing dye and if necessary an added plasticizer.

As photopolymerizable compounds there may be mentioned the photopolymerizable and photocrosslinkable monomers, oligomers and prepolymers mentioned below which have at least one ethylenic unsaturated bond per molecule, as well as their mixtures, examples of which include unsaturated carboxylic acids and their salts, esters of unsaturated carboxylic acids and aliphatic polyhydric alcohol compounds, and amide-bonded compounds of unsaturated carboxylic acids and aliphatic polyvalent amine compounds.

As specific examples of unsaturated carboxylic acid monomers there may be mentioned acrylic acid, methacrylic acid, itaconic acid, crotonic acid, isocrotonic acid, maleic acid and their halogen-substituted unsaturated carboxylic acids, such as chlorinated unsaturated carboxylic acids, brominated unsaturated carboxylic acids and fluorinated unsaturated carboxylic acids. Salts of unsaturated carboxylic acids include sodium and potassium salts of the aforementioned acids.

As specific examples of ester monomers of aliphatic polyhydric alcohol compounds and unsaturated carboxylic acids there may be mentioned acrylic acid esters such as ethyleneglycol diacrylate, triethyleneglycol diacrylate, 1,3-butanediol diacrylate, tetramethyleneglycol diacrylate, propyleneglycol diacrylate, neopentylglycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethyleneglycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, polyester acrylate oligomer, 2-phenoxyethyl acrylate, 2-phenoxyethyl methacrylate, phenolethoxylate monoacrylate, 2-(p-chlorophenoxy)ethyl acrylate, p-chlorophenyl acrylate, phenyl acrylate, 2-phenylethyl acrylate, bisphenol A (2-acryloxyethyl) ether, ethoxylated bisphenol A diacrylate, 2-(1-naphthyloxy)ethyl acrylate, o-biphenyl methacrylate and o-biphenyl acrylate.

Methacrylic acid esters include tetramethyleneglycol dimethacrylate, triethyleneglycol dimethacrylate, neopentylglycol dimethacrylate, trimethylolpropane trimethacrylate, trimethylolethane trimethacrylate, ethyleneglycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis-[p-(3-methacryloxy-2-hydroxypropoxy)phenyl]dimethylmethane, bis-[p-(acryloxyethoxy)phenyl]dimethylmethane, 2,2-bis(4-methacryloyloxyphenyl)propane and 2-naphthyl methacrylate.

As itaconic acid esters there may be mentioned ethyleneglycol diitaconate, propyleneglycol diitaconate, 1,3-butanediol diitaconate, 1,4-butanediol diitaconate, tetramethyleneglycol diitaconate, pentaerythritol diitaconate and sorbitol tetraitaconate.

As crotonic acid esters there may be mentioned ethyleneglycol dicrotonate, tetramethyleneglycol dicrotonate, pentaerythritol dicrotonate and sorbitol tetracrotonate.

As isocrotonic acid esters there may be mentioned ethyleneglycol diisocrotonate, pentaerythritol diisocrotonate and sorbitol tetraisocrotonate.

As maleic acid esters there may be mentioned ethyleneglycol dimaleate, triethyleneglycol dimaleate, pentaerythritol dimaleate and sorbitol tetramaleate.

As halogenated unsaturated carboxylic acids there may be mentioned 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, 2,4,6-tribromophenyl methacrylate, dibromoneopentyl dimethacrylate (trade name: NK ESTER DBN, Shin Nakamura Kagaku Kogyo, KK.), dibromopropyl acrylate (trade name: NK ESTER A-DBP, Shin Nakamura Kagaku Kogyo, KK.), dibromopropyl methacrylate (trade name: NK ESTER DBP, Shin Nakamura Kagaku Kogyo, KK.), methacrylic chloride, 2,4,6-trichlorophenyl methacrylate, p-chlorostyrene, methyl-2-chloroacrylate, ethyl-2-chloroacrylate, n-butyl-2-chloroacrylate, tribromophenol acrylate and tetrabromophenol acrylate.

As specific examples of amide monomers of unsaturated carboxylic acids and aliphatic polyvalent amine compounds there may be mentioned methylene bisacrylamide, methylene bismethacrylamide, 1,6-hexamethylene bisacrylamide, 1,6-hexamethylene bismethacrylamide, diethylenetriamine trisacrylamide, xylylene bisacrylamide, xylylene bismethacrylamide, N-phenylmethacrylamide and diacetone acrylamide.

As additional examples there may be mentioned the polyisocyanate compounds with at least 2 isocyanate groups per molecule described in Japanese Examined Patent Publication No. 48-41708, and vinyl urethane compounds with at least 2 polymerizable vinyl groups per molecule with an added hydroxyl group-containing vinyl monomer represented by the following general formula $$CH_2=C(R)COOCH_2CH(R')OH$$

where R and R' represent hydrogen or methyl groups.

There may also be mentioned the urethane acrylates mentioned in Japanese Unexamined Patent Publication No. 51-37193, and the polyester acrylates and polyfunctional acrylates and methacrylates of epoxy resins and (meth)acrylic acid such as mentioned in Japanese Unexamined Patent Publication No. 48-64183, Japanese Examined Patent Publication No. 49-43191 and Japanese Examined Patent Publication No. 52-30490.

The photocurable monomers and oligomers listed in the Journal of the Nihon Secchaku Association, Vol. 20, No. 7, pp. 300-308 may also be used.

Also, as phosphorus-containing monomers there may be mentioned mono(2-acryloyloxyethyl) acid phosphate (trade name: Light Ester PA, product of Kyoeisha Yushi Kagaku Kogyo, KK.) and mono(2-methacryloyloxyethyl) acid phosphate (trade name: Light Ester PM, product of Kyoeisha Yushi Kagaku Kogyo, KK.), as well as the epoxy acrylate substrated products with the trade names of Lipoxy VR-60 (Showa Polymer, KK.) and Lipoxy VR-90 (Showa Polymer).

Additional ones are those with the trade names of NK Ester M-230G (product of Shin Nakamura Kagaku Kogyo, KK.) and NK Ester 23G (Shin Nakamura Kagaku Kogyo, KK.).

There may also be mentioned the triacrylates having the following structural formulas:

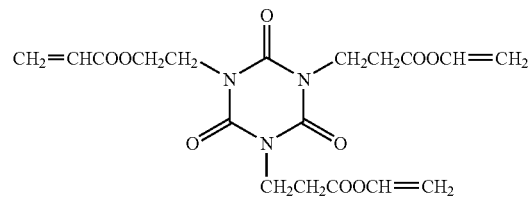

(trade name: Aronix M-315 by Toa Gosei Kagaku Kogyo, KK.)

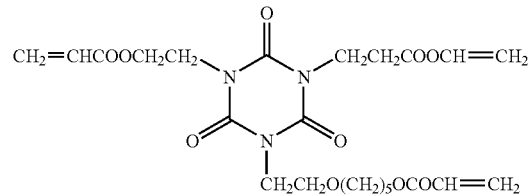

(trade name: Aronix M-325 by Toa Gosei Kagaku Kogyo, KK.), as well as 2,2'-bis(4-acryloxy diethoxyphenyl)propane (trade name: NK Ester A-BPE-4 by Shin Nakamura Kagaku, KK.) and tetramethylolmethane tetraacrylate (trade name: NK Ester A-TMMT by Shin Nakamura Kagaku, KK.).

As plasticizers to be added when necessary there may be mentioned polyhydric alcohols such as ethylene glycol, diethylene glycol, triethylene glycol, glycerin and trimethylol propane; phthalic acid ester-substrated plasticizers such as dimethyl phthalate (DMP), diethyl phthalate (DEP), dibutyl phthalate (DBP), heptyl nonyl phthalate (HNP), 2-ethylhexyl phthalate (DOP), di-n-octyl phthalate (DNOP), di-i-octyl phthalate (DCapP), (79 alkyl) phthalate (D79P), di-i-decyl phthalate (DIDP), ditridecyl phthalate (DTDP), dicyclohexyl phthalate (DCHP), butylbenzyl phthalate (BBP), ethylphthalylethyl glycolate (EPEG) and butylphthalylbutyl glycolate (BPBG); aliphatic dibasic acid ester-substrated plasticizers such as di-2-ethylhexyl adipate (DOA), di-(methylcyclohexyl)adipate, diisodecyl adipate (DIDA), di-n-hexyl azelate (DNHZ), di-2-ethylhexyl azelate (DOZ), dibutyl sebacate (DBS) and 2-ethylhexyl sebacate (DOS); citric acid ester-substrated plasticizers such as triethyl citrate (TEC), tributyl citrate (TBC), acetyltriethyl citrate (ATEC) and acetyltributyl citrate (ATBC); epoxy-substrated plasticizers such as epoxified soybean oil; and phosphoric acid ester-substrated plasticizers such as tributyl phosphate (TBP), triphenyl phosphate (TPP), tricresyl phosphate (TCP) and tripropyleneglycol phosphate.

Examples of photopolymerization initiators for the initiator system include 1,3-di(t-butyldioxycarbonyl) benzophenone, 3,3',4,4'-tetrakis(t-butyldioxycarbonyl) benzophenone, N-phenylglycine, 2,4,6-tris(trichloromethyl)-s-triazine, 3-phenyl-5-isooxazone, 2-mercaptobenzimidazole, and imidazole dimers. From the standpoint of stability of the recorded hologram, the photopolymerization initiator is preferably subjected to decomposition treatment after hologram recording. For example, ultraviolet radiation is preferred for easier decomposition of organic peroxide systems.

Examples of sensitizing dyes include thiopyrillium salt dyes, melocyanin dyes, quinoline dyes, styrylquinoline dyes, ketocoumarin dyes, thioxanthene dyes, xanthene dyes, oxonol dyes, cyanine dyes, rhodamine dyes, pyrillium ion dyes and diphenyliodonium ion dyes which absorb light at 350-600 nm. The sensitizing dye may also absorb light in the wavelength regions of less than 350 nm or greater than 600 nm.

Matrix polymers which may be used include polymethacrylic acid esters and their partial hydrolysates, polyvinyl acetate and its hydrolysates, polyvinyl alcohol and its partial acetalized products, triacetyl cellulose, polyisoprene, polybutadiene, polychloroprene, siliconee rubber, polystyrene, polyvinylbutyral, polyvinyl chloride, chlorinated polyethylene, chlorinated polypropylene, poly-N-vinylcarbazole and its derivatives, poly-N-vinylpyrrolidone and its derivatives, copolymers of styrene and maleic anhydride and their half-esters, copolymers wherein at least one of the copolymer components is selected from the group of copolymerizable monomers consisting of acrylic acid, acrylic acid esters, methacrylic acid, methacrylic acid esters, acrylamide, acrylonitrile, ethylene, propylene, vinyl chloride and vinyl acetate, as well as mixtures thereof. Preferred are polyisoprene, polybutadiene, polychloroprene, polyvinyl alcohol, and the partially acetalized polyvinyl alcohols, polyvinyl acetal and polyvinyl butyral, polyvinyl acetate, ethylene-vinyl acetate copolymer, vinyl chloride-vinyl acetate copolymer, and mixtures thereof.

The step for stabilization of the recorded hologram may be a step involving monomer shifting by heat, and for this purpose it is necessary for the matrix polymer to be suitable for monomer shifting, preferably with a relatively low glass transition point.

The photopolymerizable compound is used at a proportion of 10 parts by weight to 1000 parts by weight, and preferably 10 parts by weight to 100 parts by weight, to 100 parts by weight of the binder resin.

The photopolymerization initiator is used at a proportion of 1 part by weight to 10 parts by weight, and preferably 5 parts by weight to 10 parts by weight, to 100 parts by weight of the binder resin.

The sensitizing dye is used at a proportion of 0.01 part by weight to 1 part by weight, and preferably 0.01 part by weight to 0.5 part by weight, to 100 parts by weight of the binder resin.

As additional photosensitive material components there may be mentioned various non-ionic surfactants, cationic surfactants and anionic surfactants.

These hologram recording materials are prepared as coating solutions to a solid portion of 15%-25%, using solvents such as acetone, methyl ethyl ketone, methyl isobutyl ketone, cyclohexanone, benzene, toluene, xylene, chlorbenzene, tetrahydrofuran, methylcellosolve, ethylcellosolve, methylcellosolve acetate, ethylcellosolve acetate, ethyl acetate, 1,4-dioxane, 1,2-dichloroethane, dichlormethane, chloroform, methanol, ethanol, isopropanol, etc., or mixtures thereof. The thickness of the hologram recording layer is 0.1 μm-50 μm, and preferably 5 μm-20 μm.

An example of such a hologram recording material is Omnidex 352,706 by DuPont.

The recording light for the volume hologram layer of the invention may be, for example, light of 532 nm wavelength from a LD laser, light of 337.5 nm, 350.7 nm or 356.4 nm wavelength from a krypton laser, light of 351.1 nm or 368.8 nm wavelength from an argon laser, light of 332.4 nm wavelength from a neon laser or light of 325.0 nm wavelength from a cadmium laser, or in the visible range, light of 514.5 nm, 488 nm or 457.9 nm wavelength from an argon laser or light of 647.1 nm, 568.2 nm or 520.8 nm from a krypton laser; the monochromatic hologram or color hologram is hologram-recorded by exposure to one wavelength among these wavelengths which is capable of exciting the photopolymerization initiator.

The volume hologram layer of the invention (this will hereunder refer to the volume hologram layer in its hologram-recorded state in cases where the volume hologram layer is defined by different properties) has a glass transition point of 30° C.-70° C., and preferably 35° C.-60° C.

The dynamic storage elastic modulus of the volume hologram layer of the invention is one of the properties reflecting the hardness of the volume hologram layer, and the following measuring apparatus and measuring method are employed.

Measuring sample: hologram recording film: A volume hologram film prepared by hologram recording on a laminated film consisting of a PET film/volume hologram layer/polyvinyl chloride film or PET film laminate, and releasing the PET film and polyvinyl chloride film or PET film.

In the case where the sample to be measured comprises a laminate of a hologram layer and an adhesive layer, only the hologram layer in the form of film is separated from the laminate to measure by the film tension method mentioned below. Parallel plate method can also be used by separating the hologram layer and rolling up the separated layer.

Measuring apparatus: Solid Viscoelasticity Analyzer RSA-II, product of Rheometrics Measuring attachment (mode): Film tension Measuring frequency: 6.28 rad/s Measuring temperature: −50° C. to 100° C.

Measuring method:

(1) The sample is set in a film tension measuring frame.

(2) The temperature dependency at 6.28 rad/s is measured in a temperature range of −50° C. to 100° C., and the temperature dependency data is used to determine the dynamic storage elastic modulus (E', Pa) at 25° C. and 50° C. 25° C. was selected from the viewpoint of comparison with the hardness at room temperature, and 50° C. was selected from the viewpoint of comparison with the hardness during storage by warehousing, etc. in summertime.

The volume hologram layer of the invention has a dynamic storage elastic modulus of $5 \times 10^5$ Pa to $5 \times 10^7$ Pa at 50° C.

The half-width of diffraction light in the volume hologram recorded in the volume hologram layer of the invention is no greater than 30 nm. Volume holograms recorded using color tuning films, when the half-width of diffraction light in the volume hologram is greater than 30 μm, are less prone to spotty hologram flaws under pressure, for reasons which are not fully understood but will be explained below by way of reference examples. According to the invention, it is particularly effective to use color Lippmann holograms and monochrome holograms wherein the half-width of diffraction light of the volume hologram is 30 nm or less.

The adhesive layers 3, 4 will now be explained. As adhesive layers there may be mentioned acryl resins and acrylic acid ester resins and their copolymers, styrene-butadiene copolymer, natural rubber, casein, gelatin, rosin esters, terpene resins, phenolic resins, styrene-substrated resins, croman-indene resin, polyvinyl ether, siliconee resins, etc. as well as—cyanoacrylate-substrated, siliconee-substrated, maleimide-substrated, styrol-substrated, polyolefin-substrated, resorcinol-substrated and polyvinyl ether-substrated adhesives. The adhesive layer may also have an isocyanate-substrated crosslinking agent or metal chelate-substrated crosslinking agent added thereto for its use. It may also be formed using a so-called "two-part crosslinkable adhesive". The thickness of the adhesive layer may be from 4 μm to 20 μm.

The dynamic storage elastic modulus of the second adhesive layer between the volume hologram layer and the surface protective film according to the invention is one of the properties reflecting the hardness of the adhesive layer, and the following measuring apparatus and measuring method are employed.

Measuring sample: After coating a Separator A ("SP-PETO05", product of Tokyo Cellophane, KK.) with the adhesive to a dry film thickness of 15 μm, a Separator B ("SP-PETO02", product of Tokyo Cellophane, KK.) is laminated on the coated side and allowed to age for one week at room temperature. For the measurement, Separator A is peeled, the adhesive layer is smoothed using a spatula or the like to avoid introducing air bubbles, and its size is contained within 4.75 mmø parallel plates (compressed) as the measuring attachment (mode) in the measuring apparatus described below, while keeping a constant thickness of 2.5-3.5 mm as set in the measuring apparatus.

Measuring apparatus: Viscoelasticity Analyzer RSA-II, product of Rheometrics

Measuring attachment (mode): Parallel plate (compressed) 4.75 mmø

Measuring frequency: 6.28 rad/s

Measuring temperature: −50° C. to 100° C.

Measuring method:

(1) The sample is sandwiched with parallel plates and set.

(2) The temperature dependency at 6.28 rad/s is measured in a temperature range of −50° C. to 100° C., and the temperature dependency data is used to determine the dynamic storage elastic modulus (Pa) at 25° C. and 50° C.

Figure 3:
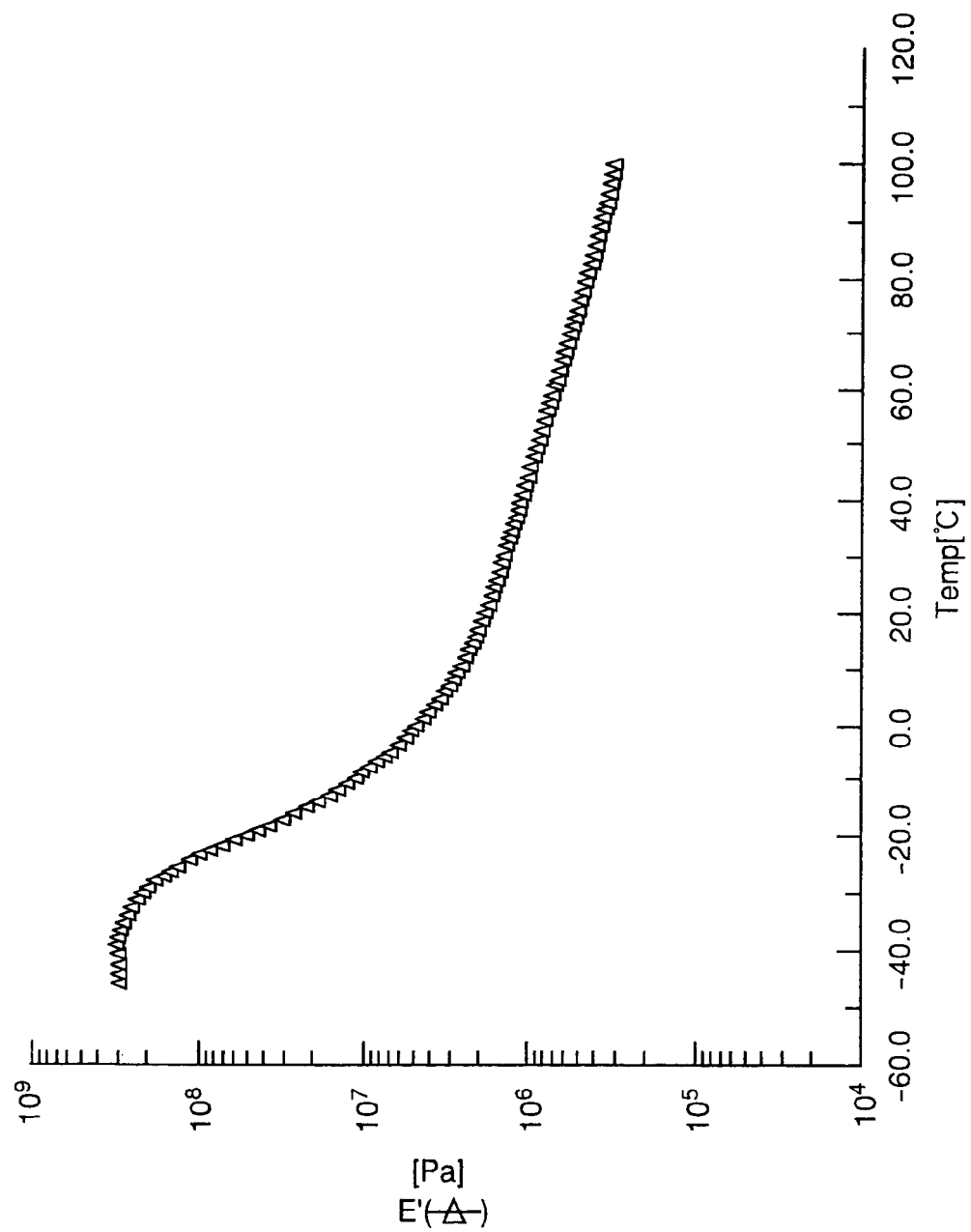
FIG. 3 shows an example of data obtained for the dynamic storage elastic modulus of the second adhesive layer.

An example of data obtained for the temperature dependency of the dynamic storage elastic modulus is shown in FIG. 3. The example shown here is for the second adhesive layer formed in Example 3 described below, and in this case the dynamic storage elastic modulus at 50° C. was $8 \times 10^5$ Pa.

The second adhesive layer in the first volume hologram laminate of the invention has a dynamic storage elastic modulus of no greater than $5 \times 10^4$ Pa, and preferably from $5 \times 10^4$ Pa to $1 \times 10^3$ Pa, at 50° C. when measured at 6.28 rad/s, or at least $2.5 \times 10^5$ Pa, and preferably from $2.5 \times 10^5$ Pa to $5 \times 10^7$ Pa. Those of over $5 \times 10^4$ Pa and less than $2.5 \times 10^5$ Pa exhibit many more spotty hologram flaws under pressurized conditions.

The surface protective film 6 in the volume hologram laminate of the invention is transparent, and will typically be a resin, for example a polyethylene film, polypropylene film, polyethylene fluoride-substrated film, polyvinylidene fluoride film, polyvinyl chloride film, polyvinylidene chloride film, ethylene-vinyl alcohol film, polyvinyl alcohol film, polymethyl methacrylate film, polyether sulfone film, polyetherether ketone film, polyamide film, tetrafluoroethylene-perfluoroalkyl vinyl ether copolymer film, a polyester film such as a polyethylene terephthalate film, or a polyimide film, and the film thickness is 2 μm-200 μm, and preferably 10 μm-50 μm.

Though not shown in the drawing, if necessary the surface protective film may be subjected to hard coat treatment for the purpose of increasing the protective property of the surface protective film surface. The hard coat treatment may involve a dipping application, spray application or roll coat application method in a siliconee system, fluorinated siliconee system, melamine alkyd system or urethane-acrylate system (ultraviolet curing type), to a film thickness of 1 μm-50 μm, and preferably 3 μm-25 μm.

Also not shown, the surface protective film 6 surface or hard coat treated surface may be further subjected to release treatment. The release treatment may be accomplished by a method of dipping application, spray application or roll coat application in a fluorine substrated release agent, siliconee-substrated release agent, stearic acid-substrated release agent, wax-substrated release agent or the like.

The volume hologram laminate-fabricating label used for fabrication of the volume hologram laminate of the invention is shown in FIG. 3 by its cross-sectional layer structure. Here, 10 is the volume hologram laminate-fabricating label, 11 is a peel sheet, and the same references numerals as in FIG. 1 indicate like elements.

The volume hologram laminate-fabricating label of the invention is used to fabricate the aforementioned volume hologram laminate, and as shown in the drawing, it has a first adhesive layer 3 volume hologram layer 5, second adhesive layer 4 and surface protective film 6 laminated on a peel sheet 11.

While the volume hologram laminate-fabricating label of the invention has the structure as shown in FIG. 3 wherein the volume hologram layer 5 is laminated on the peel sheet 11 via the first adhesive layer 3, it may also have a structure wherein the volume hologram layer 5 is laminated on the peel sheet 11 via double-sided adhesive tape, in which case it may have an adhesive layer, a plastic film such as a transparent or colored polyethylene terephthalate film, a first adhesive layer 3, a volume hologram layer 5, a second adhesive layer 4 and a surface protective film 6 laminated in that order on the peel sheet 11.

The peel sheet 11 used may be a commonly employed peel sheet, or a releasable film prepared by release-treating the polyethylene terephthalate film surface with a fluorine-substrated release agent or siliconee-substrated release agent, and the side of the peel sheet not facing the adhesive layer may be release-treated to avoid blocking by adhesive which has seeped from the sides of the label. Also, in order to permit peel of the laminate from the peel sheet at appropriate sizes, the laminate may be subjected to "half-cutting", or perforations or other cuts may be made in the peel sheet.

The label 10 is laminated on the substrate of the volume hologram laminate from the side of the first adhesive layer 3 after peeling off the peel sheet 11, to thus fabricate the volume hologram laminate shown in FIG. 1.

Second Invention

Figure 5:
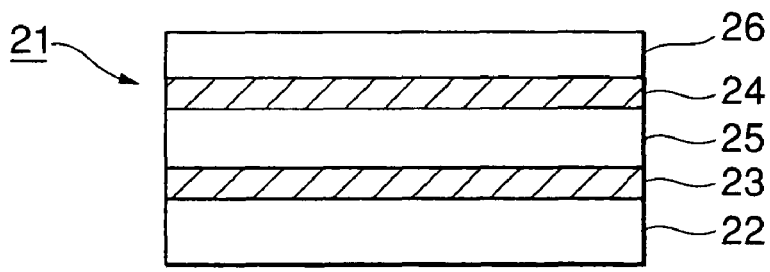

A volume hologram laminate according to the invention is shown cross-sectionally in FIG. 5. Here, 21 is the volume hologram laminate, 22 is a substrate, 23 is a first adhesive layer, 24 is a second adhesive layer, 25 is a volume hologram layer and 26 is a surface protective film.

The substrate 22 of the volume hologram laminate of the invention can be a film or sheet made of paper, synthetic paper, synthetic resin or metal, and may be in various forms including that of a sheet such as an examination admission ticket, that of a card such as an ID card, or that of a small booklet such as a passport; a hologram body in which a mono-color or full-color image are recorded can be laminated onto a picture of personal features or landscaps. When used as a color filter for a liquid crystal display element, a glass panel or electrode layer will serve as the substrate in a liquid crystal cell.

The volume hologram laminate of the invention is shown in FIG. 5 as having a construction wherein the volume hologram layer 25 is laminated on the substrate 22 via the first adhesive layer 23, but it may also have a construction wherein the volume hologram layer 25 is laminated on the substrate 22 via double-sided adhesive tape, in which case it may have the first adhesive layer 23, the volume hologram layer 25, the second adhesive layer 24 and the surface protective film 26 formed in that order on the substrate 22, via an adhesive layer and a plastic film such as a transparent or colored polyethylene terephthalate film.

The volume hologram layer 25 can be easily fabricated by coating a support film with a volume hologram recording material and then recording in the layer an interference pattern corresponding to the wavefront of light from an object by transmittivity modulation or refractivity modulation, or for reproduction, by joining with a volume hologram plate and developing by exposure to light.

The volume hologram layer 25 is a photosensitive material for volume phase-type hologram recording with dry processing which comprises a matrix polymer, a photopolymerizable compound, a photopolymerization initiator, a sensitizing dye and if necessary an added plasticizer.

As photopolymerizable compounds there may be mentioned the photopolymerizable and photocrosslinkable monomers, oligomers and prepolymers mentioned below which have at least one ethylenic unsaturated bond per molecule, as well as their mixtures, examples of which include unsaturated carboxylic acids and their salts, esters of unsaturated carboxylic acids and aliphatic polyhydric alcohol compounds, and amide-bonded compounds of unsaturated carboxylic acids and aliphatic polyvalent amine compounds.

As specific examples of unsaturated carboxylic acid monomers there may be mentioned acrylic acid, methacrylic acid, itaconic acid, crotonic acid, isocrotonic acid, maleic acid and their halogen-substituted unsaturated carboxylic acids, such as chlorinated unsaturated carboxylic acids, brominated unsaturated carboxylic acids and fluorinated unsaturated carboxylic acids. Salts of unsaturated carboxylic acids include sodium and potassium salts of the aforementioned acids.

As specific examples of ester monomers of aliphatic polyhydric alcohol compounds and unsaturated carboxylic acids there may be mentioned acrylic acid esters such as ethyleneglycol diacrylate, triethyleneglycol diacrylate, 1,3-butanediol diacrylate, tetramethyleneglycol diacrylate, propyleneglycol diacrylate, neopentylglycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethyleneglycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri (acryloyloxyethyl)isocyanurate, polyester acrylate oligomer, 2-phenoxyethyl acrylate, 2-phenoxyethyl methacrylate, phenolethoxylate monoacrylate, 2-(p-chlorophenoxy)ethyl acrylate, p-chlorophenyl acrylate, phenyl acrylate, 2-phenylethyl acrylate, bisphenol A (2-acryloxyethyl)ether, ethoxylated bisphenol A diacrylate, 2-(1-naphthyloxy)ethyl acrylate, o-biphenyl methacrylate and o-biphenyl acrylate.

Methacrylic acid esters include tetramethyleneglycol dimethacrylate, triethyleneglycol dimethacrylate, neopentylglycol dimethacrylate, trimethylolpropane trimethacrylate, trimethylolethane trimethacrylate, ethyleneglycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis-[p-(3-methacryloxy-2-hydroxypropoxy)phenyl] dimethylmethane, bis-[p-(acryloxyethoxy)phenyl] dimethylmethane, 2,2-bis(4-methacryloyloxyphenyl (propane and 2-naphthyl methacrylate.

As itaconic acid esters there may be mentioned ethyleneglycol diitaconate, propyleneglycol diitaconate, 1,3-butanediol diitaconate, 1,4-butanediol diitaconate, tetramethyleneglycol diitaconate, pentaerythritol diitaconate and sorbitol tetraitaconate.

As crotonic acid esters there may be mentioned ethyleneglycol dicrotonate, tetramethyleneglycol dicrotonate, pentaerythritol dicrotonate and sorbitol tetracrotonate.

As isocrotonic acid esters there may be mentioned ethyleneglycol diisocrotonate, pentaerythritol diisocrotonate and sorbitol tetraisocrotonate.

As maleic acid esters there may be mentioned ethyleneglycol dimaleate, triethyleneglycol dimaleate, pentaerythritol dimaleate and sorbitol tetramaleate.

As halogenated unsaturated carboxylic acids there may be mentioned 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, 2,4,6-tribromophenyl methacrylate, dibromoneopentyl dimethacrylate (trade name: NK ESTER DBN, Shin Nakamura Kagaku Kogyo, KK.), dibromopropyl acrylate (trade name: NK ESTER A-DBP, Shin Nakamura Kagaku Kogyo, KK.), dibromopropyl methacrylate (trade name: NK ESTER DBP, Shin Nakamura Kagaku Kogyo, KK.), methacrylic chloride, 2,4,6-trichlorophenyl methacrylate, p-chlorostyrene, methyl-2-chloroacrylate, ethyl-2-chloroacrylate, n-butyl-2-chloroacrylate, tribromophenol acrylate and tetrabromophenol acrylate.

As specific examples of amide monomers of unsaturated carboxylic acids and aliphatic polyvalent amine compounds there may be mentioned methylene bisacrylamide, methylene bismethacrylamide, 1,6-hexamethylene bisacrylamide, 1,6-hexamethylene bismethacrylamide, diethylenetriamine trisacrylamide, xylylene bisacrylamide, xylylene bismethacrylamide, N-phenylmethacrylamide and diacetone acrylamide.

As additional examples there may be mentioned the polyisocyanate compounds with at least 2 isocyanate groups per molecule described in Japanese Examined Patent Publication No. 48-41708, and vinyl urethane compounds with at least 2 polymerizable vinyl groups per molecule with an added hydroxyl group-containing vinyl monomer represented by the following general formula

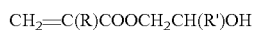

$CH_2=C(R)COOCH_2CH(R')OH$ where R and R' represent hydrogen or methyl groups.

There may also be mentioned the urethane acrylates mentioned in Japanese Unexamined Patent Publication No. 51-37193, and the polyester acrylates and polyfunctional acrylates and methacrylates of epoxy resins and (meth)acrylic acid such as mentioned in Japanese Unexamined Patent Publication No. 48-64183, Japanese Examined Patent Publication No. 49-43191 and Japanese Examined Patent Publication No. 52-30490.

The photocurable monomers and oligomers listed in the Journal of the Nihon Secchaku Association, Vol. 20, No. 7, pp. 300-308 may also be used.

Also, as phosphorus-containing monomers there may be mentioned mono(2-acryloyloxyethyl) acid phosphate (trade name: Light Ester PA, product of Kyoeisha Yushi Kagaku Kogyo, KK.) and mono(2-methacryloyloxyethyl) acid phosphate (trade name: Light Ester PM, product of Kyoeisha Yushi Kagaku Kogyo, KK.), as well as the epoxy acrylate substrated products with the trade names of Lipoxy VR-60 (Showa Polymer, KK.) and Lipoxy VR-90 (Showa Polymer).

Additional ones are those with the trade names of NK Ester M-230G (product of Shin Nakamura Kagaku Kogyo, KK.) and NK Ester 23G (Shin Nakamura Kagaku Kogyo, KK.).

There may also be mentioned the triacrylates having the following structural formulas:

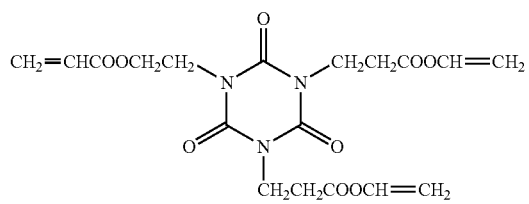

(trade name: Aronix M-315 by Toa Gosei Kagaku Kogyo, KK.)

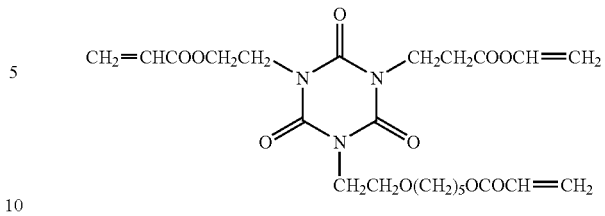

(trade name: Aronix M-325 by Toa Gosei Kagaku Kogyo, KK.), as well as 2,2'-bis(4-acryloxy diethoxyphenyl)propane (trade name: NK Ester A-BPE-4 by Shin Nakamura Kagaku, KK.) and tetramethylolmethane tetraacrylate (trade name: NK Ester A-TMMT by Shin Nakamura Kagaku, KK.).

As plasticizers to be added when necessary there may be mentioned polyhydric alcohols such as ethylene glycol, diethylene glycol, triethylene glycol, glycerin and trimethylol propane; phthalic acid ester-substrated plasticizers such as dimethyl phthalate (DMP), diethyl phthalate (DEP), dibutyl phthalate (DBP), heptyl nonyl phthalate (HNP), 2-ethylhexyl phthalate (DOP), di-n-octyl phthalate (DNOP), di-i-octyl phthalate (DCapP), (79 alkyl) phthalate (D79P), di-i-decyl phthalate (DIDP), ditridecyl phthalate (DTDP), dicyclohexyl phthalate (DCHP), butylbenzyl phthalate (BBP), ethylphthalylethyl glycolate (EPEG) and butylphthalylbutyl glycolate (BPBG); aliphatic dibasic acid ester-substrated plasticizers such as di-2-ethylhexyl adipate (DOA), di-(methylcyclohexyl) adipate, diisodecyl adipate (DIDA), di-n-hexyl azelate (DNHZ), di-2-ethylhexyl azelate (DOZ), dibutyl sebacate (DBS) and 2-ethylhexyl sebacate (DOS); citric acid ester-substrated plasticizers such as triethyl citrate (TEC), tributyl citrate (TBC), acetyltriethyl citrate (ATEC) and acetyltributyl citrate (ATBC); epoxy-substrated plasticizers such as epoxified soybean oil; and phosphoric acid ester-substrated plasticizers such as tributyl phosphate (TBP), triphenyl phosphate (TPP), tricresyl phosphate (TCP) and tripropyleneglycol phosphate.

Examples of photopolymerization initiators for the initiator system include 1,3-di(t-butyldioxycarbonyl) benzophenone, 3,3',4,4'-tetrakis(t-butyldioxycarbonyl) benzophenone, N-phenylglycine, 2,4,6-tris(trichloromethyl)-s-triazine, 3-phenyl-5-isooxazone, 2-mercaptobenzimidazole, and imidazole dimers. From the standpoint of stability of the recorded hologram, the photopolymerization initiator is preferably subjected to decomposition treatment after hologram recording. For example, ultraviolet radiation is preferred for easier decomposition of organic peroxide systems.

Examples of sensitizing dyes include thiopyrillium salt dyes, melocyanin dyes, quinoline dyes, styrylquinoline dyes, ketocoumarin dyes, thioxanthene dyes, xanthene dyes, oxonol dyes, cyanine dyes, rhodamine dyes, pyrillium ion dyes and diphenyliodonium ion dyes which absorb light at 350-600 nm. The sensitizing dye may also absorb light in the wavelength regions of less than 350 nm or greater than 600 nm.

Matrix polymers which may be used include polymethacrylic acid esters and their partial hydrolysates, polyvinyl acetate and its hydrolysates, polyvinyl alcohol and its partial acetalized products, triacetyl cellulose, polyisoprene, polybutadiene, polychloroprene, siliconee rubber, polystyrene, polyvinylbutyral, polyvinyl chloride, chlorinated polyethylene, chlorinated polypropylene, poly-N-vinylcarbazole and its derivatives, poly-N-vinylpyrrolidone and its derivatives, copolymers of styrene and maleic anhydride and their half-esters, copolymers wherein at least one of the copolymer components is selected from the group of copolymerizable monomers consisting of acrylic acid, acrylic acid esters, methacrylic acid, methacrylic acid esters, acrylamide, acrylonitrile, ethylene, propylene, vinyl chloride and vinyl acetate, as well as mixtures thereof. Preferred are polyisoprene, polybutadiene, polychloroprene, polyvinyl alcohol, and the partially acetalized polyvinyl alcohols, polyvinyl acetal and polyvinyl butyral, polyvinyl acetate, ethylene-vinyl acetate copolymer, vinyl chloride-vinyl acetate copolymer, and mixtures thereof.

The step for stabilization of the recorded hologram may be a step involving monomer shifting by heat, and for this purpose it is necessary for the matrix polymer to be suitable for monomer shifting, preferably with a relatively low glass transition point.

The photopolymerizable compound is used at a proportion of 10 parts by weight to 1000 parts by weight, and preferably 10 parts by weight to 100 parts by weight, to 100 parts by weight of the binder resin.

The photopolymerization initiator is used at a proportion of 1 part by weight to 10 parts by weight, and preferably 5 parts by weight to 10 parts by weight, to 100 parts by weight of the binder resin.

The sensitizing dye is used at a proportion of 0.01 part by weight to 1 part by weight, and preferably 0.01 part by weight to 0.5 part by weight, to 100 parts by weight of the binder resin.

As additional photosensitive material components there may be mentioned various non-ionic surfactants, cationic surfactants and anionic surfactants.

These hologram recording materials are prepared as coating solutions to a solid portion of 15%-25%, using solvents such as acetone, methyl ethyl ketone, methyl isobutyl ketone, cyclohexanone, benzene, toluene, xylene, chlorbenzene, tetrahydrofuran, methylcellosolve, ethylcellosolve, methylcellosolve acetate, ethylcellosolve acetate, ethyl acetate, 1,4-dioxane, 1,2-dichloroethane, dichlormethane, chloroform, methanol, ethanol, isopropanol, etc., or mixtures thereof. The thickness of the hologram recording layer is 0.1 μm-50 μm, and preferably 5 μm-20 μm.

An example of such a hologram recording material is Omnidex 352,706 by DuPont.

The recording light for the volume hologram layer of the invention may be, for example, light of 532 nm wavelength from a LD laser, light of 337.5 nm, 350.7 nm or 356.4 nm wavelength from a krypton laser, light of 351.1 nm or 368.8 nm wavelength from an argon laser, light of 332.4 nm wavelength from a neon laser or light of 325.0 nm wavelength from a cadmium laser, or in the visible range, light of 514.5 nm, 488 nm or 457.9 nm wavelength from an argon laser or light of 647.1 nm, 568.2 nm or 520.8 nm from a krypton laser; the monochromatic hologram or color hologram is hologram-recorded by exposure to one wavelength among these wavelengths which is capable of exciting the photopolymerization initiator.

The volume hologram layer of the invention (this will hereunder refer to the volume hologram layer in its hologram-recorded state in cases where the volume hologram layer is defined by different properties) has a glass transition point of 30° C.-70° C., and preferably 35° C.-60° C.

The dynamic storage elastic modulus of the volume hologram layer of the invention is one of the properties reflecting the hardness of the volume hologram layer, and the following measuring apparatus and measuring method are employed.

Measuring sample: hologram recording film: A volume hologram film prepared by hologram recording on a laminated film consisting of a PET film/volume hologram layer/polyvinyl chloride film or PET film laminate, and releasing the PET film and polyvinyl chloride film or PET film.

In the case where the sample to be measured comprises a laminate of a hologram layer and an adhesive layer, only the hologram layer in the form of film is separated from the laminate to measure by the film tension method mentioned below. Parallel plate method can also be used by separating the hologram layer and rolling up the separated layer.

Measuring apparatus: Solid Viscoelasticity Analyzer RSA-II, product of Rheometrics Measuring attachment (mode): Film tension Measuring frequency: 6.28 rad/s Measuring temperature: −50° C. to 100° C.

Measuring method:

(1) The sample is set in a film tension measuring frame.

(2) The temperature dependency at 6.28 rad/s is measured in a temperature range of −50° C. to 100° C., and the temperature dependency data is used to determine the dynamic storage elastic modulus (E', Pa) at 25° C. and 50° C. 25° C. was selected from the viewpoint of comparison with the hardness at room temperature, and 50° C. was selected from the viewpoint of comparison with the hardness during storage by warehousing, etc. in summertime.

The volume hologram layer of the invention has a dynamic storage elastic modulus of $5 \times 10^5$ Pa to $5 \times 10^7$ Pa at 50° C.

The half-width of diffraction light in the volume hologram recorded in the volume hologram layer of the invention is no greater than 30 nm. Volume holograms recorded using color tuning films, when the half-width of diffraction light in the volume hologram is greater than 30 μm, do not exhibit spotty hologram flaws under pressure, for reasons which are not fully understood but will be explained below by way of reference examples. According to the invention, it is particularly effective to use color Lippmann holograms and monochrome holograms wherein the half-width of diffraction light of the volume hologram is 30 nm or less.

The adhesive layers 23, 24 will now be explained. As adhesive layers there may be mentioned acryl resins and acrylic acid ester resins and their copolymers, styrene-butadiene copolymer, natural rubber, casein, gelatin, rosin esters, terpene resins, phenolic resins, styrene-substrated resins, croman-indene resin, polyvinyl ether, siliconee resins, etc. as well as—cyanoacrylate-substrated, siliconee-substrated, maleimide-substrated, styrol-substrated, polyolefin-substrated, resorcinol-substrated and polyvinyl ether-substrated adhesives. The adhesive layer may also have an isocyanate-substrated crosslinking agent or metal chelate-substrated crosslinking agent added thereto for its use. It may also be formed using a so-called "two-part crosslinkable adhesive". The thickness of the adhesive layer may be from 4 μm to 20 μm.

The loss tangent delta (tan δ) of the second adhesive layer between the volume hologram layer and the surface protective film according to the invention is one of the properties reflecting the hardness of the adhesive layer, and the following measuring apparatus and measuring method are employed.

Measuring sample: After coating a Separator A ("SP-PETO5", product of Tokyo Cellophane, KK.) with the adhesive to a dry film thickness of 15 μm, a Separator B ("SP- PETO2", product of Tokyo Cellophane, KK.) is laminated on the coated side and allowed to age for one week at room temperature. For the measurement, Separator A is peeled, the adhesive layer is smoothed using a spatula or the like to avoid introducing air bubbles, and the size is contained within 4.75 mmø parallel plates (compressed) as the measuring attachment (mode) in the measuring apparatus described below, while keeping a constant thickness of 2.5-3.5 mm as set in the measuring apparatus.

In the case where the sample to be measured comprises a laminate of a hologram layer and an adhesive layer, only the hologram layer in the form of film is separated from the laminate to measure by the film tension method mentioned below. Parallel plate method can also be used by separating the hologram layer and rolling up the separated layer.

Measuring apparatus: viscoelasticity Analyzer RSA-II, product of Rheometrics
Measuring attachment (mode): Parallel plate (compressed) 4.75 mmø
Measuring frequency: 0.1 rad/s to 100 rad/s
Measuring temperature: 25° C., 50° C.
Measuring method:

(1) The sample is sandwiched with parallel plates and set.

(2) The temperature dependency in a range of 0.1 rad/s to 100 rad/s is measured at 25° C., and then the temperature is increased to 50° C. for measurement of the frequency dependency in the same manner at 50° C.

(3) The dynamic storage elastic modulus (E', Pa) and the dynamic loss elastic modulus (E", Pa) at 25° C. and 50° C. are measured and tan δ is calculated as dynamic loss elastic modulus (E", Pa)/dynamic storage elastic modulus (E', Pa).

The second adhesive layer in the volume hologram laminate of the invention has a loss tangent delta (tan δ) represented by dynamic loss elastic modulus/dynamic storage elastic modulus for the frequency dependency at $10^{-1}$ rad/s to 10 rad/s, which increases toward the low frequency end, particularly at from 0.4 rad/s to 1 rad/s. The degree of increase is at least 0.03, and preferably at least 0.1 higher for the tan δ value at 0.4 rad/s compared to the tan δ value at 1 rad/s.

Figure 7:
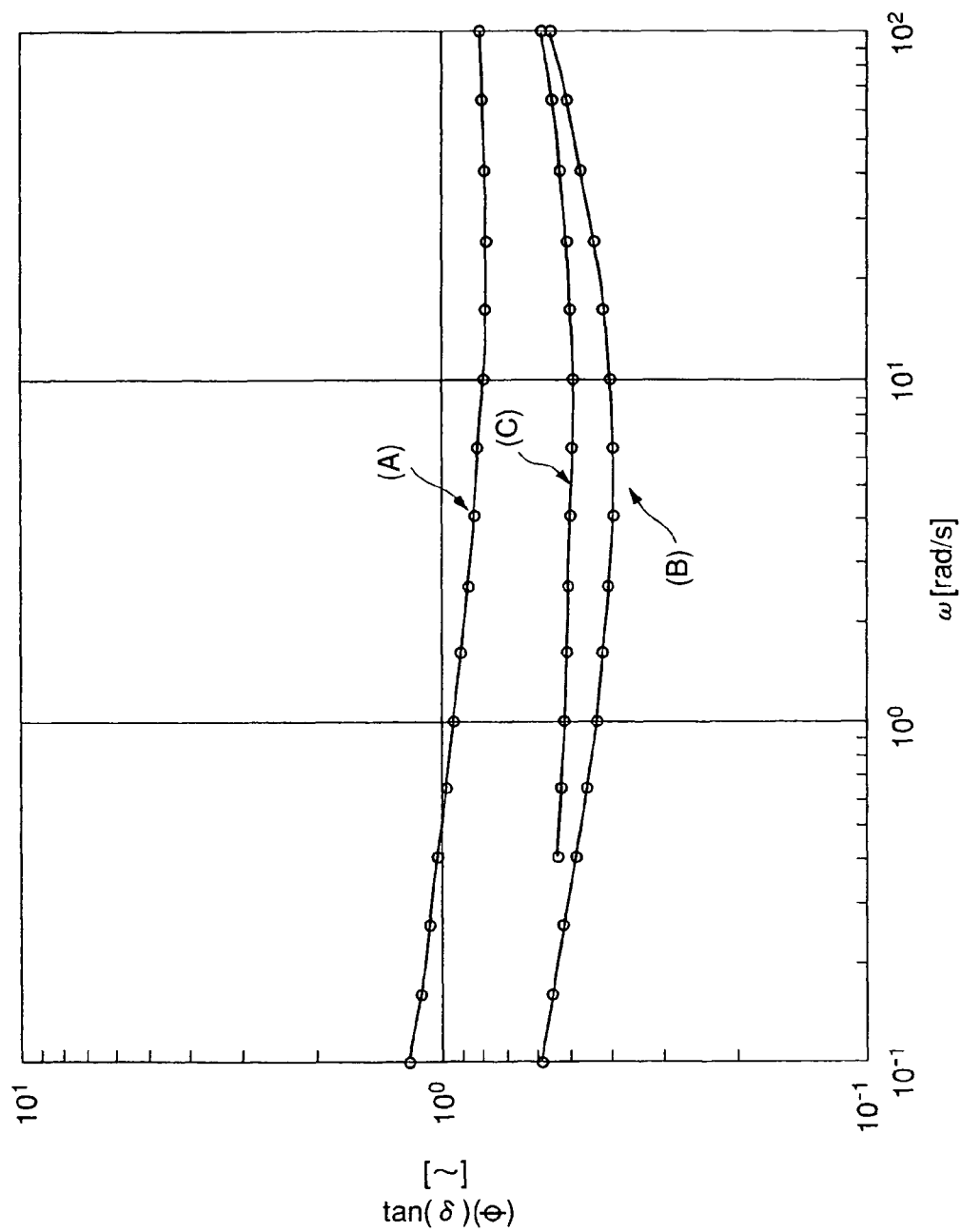
FIG. 7 and FIG. 8 show the frequency dependency of tan δ for the second adhesive layer at 25° C.

An example of data obtained for the frequency dependency of tan δ at 25° C. is shown in FIG. 7. In this figure, (A) is the frequency dependency for the second adhesive layer formed in Example B1 below, and (B) and (C) are similarly the frequency dependency for each of the respective second adhesive layers formed in Example B2 and Comparative Example B1.

Figure 8:
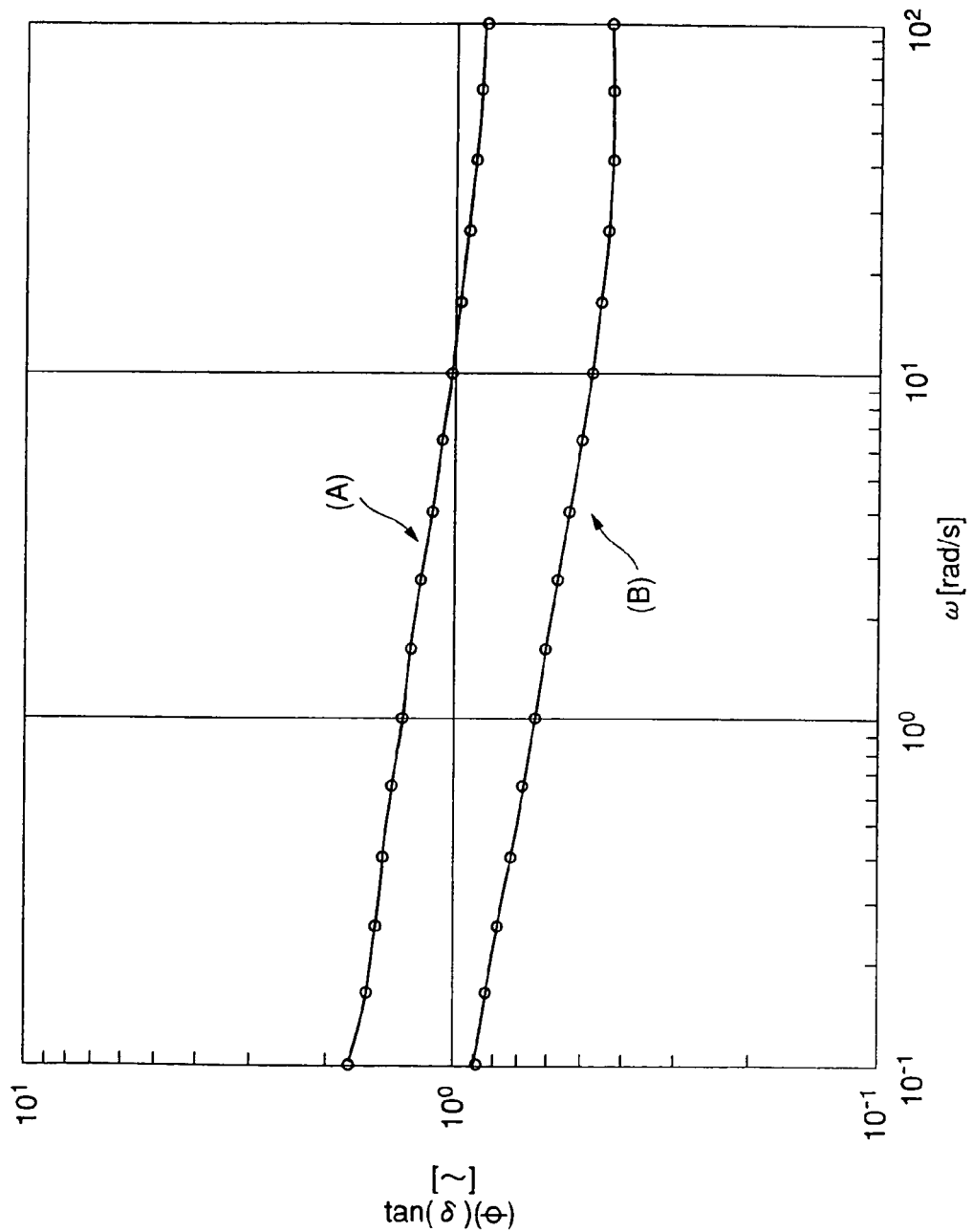

An example of data obtained for the frequency dependency of tan δ at 50° C. is shown in FIG. 8. In this figure, (A) is the frequency dependency for the second adhesive layer formed in Example B1 below, and (B) is the frequency dependency for the second adhesive layer formed in Example B2.

The surface protective film 26 in the volume hologram laminate of the invention is transparent, and will typically be a resin, for example a polyethylene film, polypropylene film, polyethylene fluoride-substrated film, polyvinylidene fluoride film, polyvinyl chloride film, polyvinylidene chloride film, ethylene-vinyl alcohol film, polyvinyl alcohol film, polymethyl methacrylate film, polyether sulfone film, polyetherether ketone film, polyamide film, tetrafluoroethyleneperfluoroalkyl vinyl ether copolymer film, a polyester film such as a polyethylene terephthalate film, or a polyimide film, and the film thickness is 2 µm-200 µm, and preferably 10 µm-50 µm.

Though not shown in the drawing, if necessary the surface protective film may be subjected to hard coat treatment for the purpose of increasing the protective property of the surface protective film surface. The hard coat treatment may involve a dipping application, spray application or roll coat application method in a siliconee system, fluorinated siliconee system, melamine alkyd system or urethane-acrylate system (ultraviolet curing type), to a film thickness of 1 µm-50 µm, and preferably 3 µm-25 µm.

Also not shown, the surface protective film 26 surface or hard coat treated surface may be further subjected to release treatment. The release treatment may be accomplished by a method of dipping application, spray application or roll coat application in a fluorine substrated release agent, siliconeesubstrated release agent, stearic acid-substrated release agent, wax-substrated release agent or the like.

Figure 6:
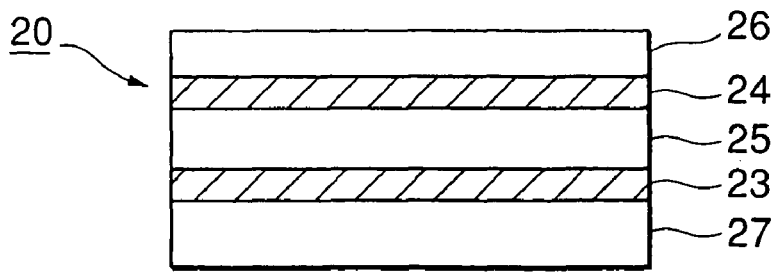

The volume hologram laminate-fabricating label used for fabrication of the volume hologram laminate of the invention is shown in FIG. 6 by its cross-sectional layer structure. Here, 20 is the volume hologram laminate-fabricating label, 27 is a peel sheet, and the same references numerals as in FIG. 5 indicate like elements.

The volume hologram laminate-fabricating label of the invention is used to fabricate the aforementioned volume hologram laminate, and as shown in FIG. 6, it has a first adhesive layer 23, volume hologram layer 25, second adhesive layer 24 and surface protective film 26 laminated on a peel sheet 27.

The peel sheet 27 used may be a commonly employed peel sheet, or a releasable film prepared by release-treating the polyethylene terephthalate film surface with a fluorine-substrated release agent or siliconee-substrated release agent, and the side of the peel sheet not facing the adhesive layer may be release-treated to avoid blocking by adhesive which has seeped from the sides of the label. Also, in order to permit peel of the laminate from the peel sheet at appropriate sizes, the laminate may be subjected to "half-cutting", or perforations or other cuts may be made in the peel sheet.

The label 20 is laminated on the substrate of the volume hologram laminate from the side of the first adhesive layer 23 after peeling off the peel sheet 27, to thus fabricate the volume hologram laminate shown in FIG. 5.

Third Invention

Figure 9:
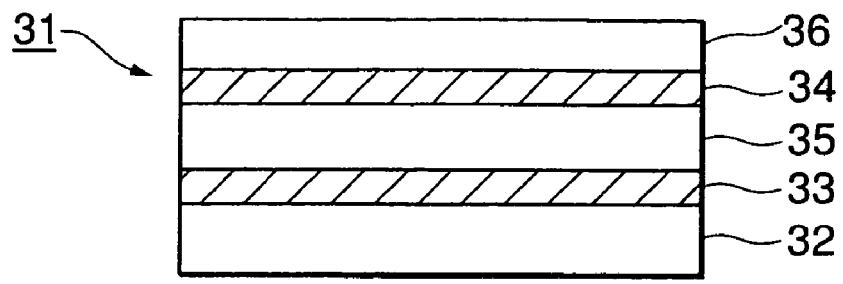

A volume hologram laminate according to the invention is shown cross-sectionally in FIG. 9. Here, 31 is the volume hologram laminate, 32 is a substrate, 33 is a first adhesive layer, 34 is a second adhesive layer, 35 is a volume hologram layer and 36 is a surface protective film.

The substrate 32 of the volume hologram laminate of the invention can be a film or sheet made of paper, synthetic paper, synthetic resin or metal, and may be in various forms including that of a sheet such as an examination admission ticket, that of a card such as an ID card, or that of a small booklet such as a passport; a hologram body in which a mono-color or full-color image are recorded can be laminated onto a picture of personal features or landscaps. When used as a color filter for a liquid crystal display element, a glass panel or electrode layer will serve as the substrate in a liquid crystal cell.

The volume hologram laminate of the invention is shown in FIG. 9 as having a construction wherein the volume hologram layer 35 is laminated on the substrate 32 via the first adhesive layer 33, but it may also have a construction wherein the volume hologram layer 35 is laminated on the substrate 32 via double-sided adhesive tape, in which case it may have the first adhesive layer 33, the volume hologram layer 35, the second adhesive layer 34 and the surface protective film 36 laminated in that order on the substrate 32, via an adhesive layer and a plastic film such as a transparent or colored polyethylene terephthalate film.

The volume hologram layer 35 can be easily fabricated by coating a support film with a volume hologram recording material and then recording in the layer an interference pattern corresponding to the wavefront of light from an object by transmittivity modulation or refractivity modulation, or for reproduction, by joining with a volume hologram plate and developing by exposure to light.

The volume hologram layer 35 is a photosensitive material for volume phase-type hologram recording with dry processing which comprises a matrix polymer, a photopolymerizable compound, a photopolymerization initiator, a sensitizing dye and if necessary an added plasticizer.

As photopolymerizable compounds there may be mentioned the photopolymerizable and photocrosslinkable monomers, oligomers and prepolymers mentioned below which have at least one ethylenic unsaturated bond per molecule, as well as their mixtures, examples of which include unsaturated carboxylic acids and their salts, esters of unsaturated carboxylic acids and aliphatic polyhydric alcohol compounds, and amide-bonded compounds of unsaturated carboxylic acids and aliphatic polyvalent amine compounds.

As specific examples of unsaturated carboxylic acid monomers there may be mentioned acrylic acid, methacrylic acid, itaconic acid, crotonic acid, isocrotonic acid, maleic acid and their halogen-substituted unsaturated carboxylic acids, such as chlorinated unsaturated carboxylic acids, brominated unsaturated carboxylic acids and fluorinated unsaturated carboxylic acids. Salts of unsaturated carboxylic acids include sodium and potassium salts of the aforementioned acids.

As specific examples of ester monomers of aliphatic polyhydric alcohol compounds and unsaturated carboxylic acids there may be mentioned acrylic acid esters such as ethyleneglycol diacrylate, triethyleneglycol diacrylate, 1,3-butanediol diacrylate, tetramethyleneglycol diacrylate, propyleneglycol diacrylate, neopentylglycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethyleneglycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, polyester acrylate oligomer, 2-phenoxyethyl acrylate, 2-phenoxyethyl methacrylate, phenolethoxylate monoacrylate, 2-(p-chlorophenoxy)ethyl acrylate, p-chlorophenyl acrylate, phenyl acrylate, 2-phenylethyl acrylate, bisphenol A (2-acryloxyethyl)ether, ethoxylated bisphenol A diacrylate, 2-(1-naphthyloxy)ethyl acrylate, o-biphenyl methacrylate and o-biphenyl acrylate.

Methacrylic acid esters include tetramethyleneglycol dimethacrylate, triethyleneglycol dimethacrylate, neopentylglycol dimethacrylate, trimethylolpropane trimethacrylate, trimethylolethane trimethacrylate, ethyleneglycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis-[p-(3-methacryloxy-2-hydroxypropoxy)phenyl] dimethylmethane, bis-[p-(acryloxyethoxy)phenyl] dimethylmethane, 2,2-bis(4-methacryloyloxyphenyl) propane and 2-naphthyl methacrylate.

As itaconic acid esters there may be mentioned ethyleneglycol diitaconate, propyleneglycol diitaconate, 1,3-butanediol diitaconate, 1,4-butanediol diitaconate, tetramethyleneglycol diitaconate, pentaerythritol diitaconate and sorbitol tetraitaconate.

As crotonic acid esters there may be mentioned ethyleneglycol dicrotonate, tetramethyleneglycol dicrotonate, pentaerythritol dicrotonate and sorbitol tetracrotonate.

As isocrotonic acid esters there may be mentioned ethyleneglycol diisocrotonate, pentaerythritol diisocrotonate and sorbitol tetraisocrotonate.

As maleic acid esters there may be mentioned ethyleneglycol dimaleate, triethyleneglycol dimaleate, pentaerythritol dimaleate and sorbitol tetramaleate.

As halogenated unsaturated carboxylic acids there may be mentioned 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, 2,4,6-tribromophenyl methacrylate, dibromoneopentyl dimethacrylate (trade name: NK ESTER DBN, Shin Nakamura Kagaku Kogyo, KK.), dibromopropyl acrylate (trade name: NK ESTER A-DBP, Shin Nakamura Kagaku Kogyo, KK.), dibromopropyl methacrylate (trade name: NK ESTER DBP, Shin Nakamura Kagaku Kogyo, KK.), methacrylic chloride, 2,4,6-trichlorophenyl methacrylate, p-chlorostyrene, methyl-2-chloroacrylate, ethyl-2-chloroacrylate, n-butyl-2-chloroacrylate, tribromophenol acrylate and tetrabromophenol acrylate.

As specific examples of amide monomers of unsaturated carboxylic acids and aliphatic polyvalent amine compounds there may be mentioned methylene bisacrylamide, methylene bismethacrylamide, 1,6-hexamethylene bisacrylamide, 1,6-hexamethylene bismethacrylamide, diethylenetriamine trisacrylamide, xylylene bisacrylamide, xylylene bismethacrylamide, N-phenylmethacrylamide and diacetone acrylamide.

As additional examples there may be mentioned the polyisocyanate compounds with at least 2 isocyanate groups per molecule described in Japanese Examined Patent Publication No. 48-41708, and vinyl urethane compounds with at least 2 polymerizable vinyl groups per molecule with an added hydroxyl group-containing vinyl monomer represented by the following general formula

where R and R' represent hydrogen or methyl groups.

There may also be mentioned the urethane acrylates mentioned in Japanese Unexamined Patent Publication No. 51-37193, and the polyester acrylates and polyfunctional acrylates and methacrylates of epoxy resins and (meth) acrylic acid such as mentioned in Japanese Unexamined Patent Publication No. 48-64183, Japanese Examined Patent Publication No. 49-43191 and Japanese Examined Patent Publication No. 52-30490.

The photocurable monomers and oligomers listed in the Journal of the Nihon Secchaku Association, Vol. 20, No. 7, pp. 300-308 may also be used.

Also, as phosphorus-containing monomers there may be mentioned mono(2-acryloyloxyethyl) acid phosphate (trade name: Light Ester PA, product of Kyoeisha Yushi Kagaku Kogyo, KK.) and mono(2-methacryloyloxyethyl) acid phosphate (trade name: Light Ester PM, product of Kyoeisha Yushi Kagaku Kogyo, KK.), as well as the epoxy acrylate substrated products with the trade names of Lipoxy VR-60 (Showa Polymer, KK.) and Lipoxy VR-90 (Showa Polymer).

Additional ones are those with the trade names of NK Ester M-230G (product of Shin Nakamura Kagaku Kogyo, KK.) and NK Ester 23G (Shin Nakamura Kagaku Kogyo, KK.).

There may also be mentioned the triacrylates having the following structural formulas:

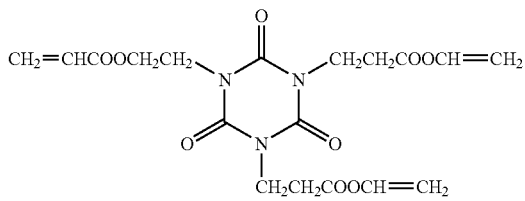

(trade name: Aronix M-315 by Toa Gosei Kagaku Kogyo, KK.)

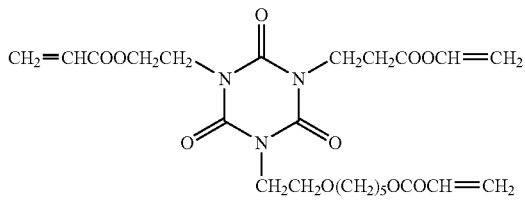

(trade name: Aronix M-325 by Toa Gosei Kagaku Kogyo, KK.), as well as 2,2'-bis(4-acryloxy diethoxyphenyl)propane (trade name: NK Ester A-BPE-4 by Shin Nakamura Kagaku, KK.) and tetramethylolmethane tetraacrylate (trade name: NK Ester A-TMMT by Shin Nakamura Kagaku, KK.).

As plasticizers to be added when necessary there may be mentioned polyhydric alcohols such as ethylene glycol, diethylene glycol, triethylene glycol, glycerin and trimethylol propane; phthalic acid ester-substrated plasticizers such as dimethyl phthalate (DMP), diethyl phthalate (DEP), dibutyl phthalate (DBP), heptyl nonyl phthalate (HNP), 2-ethylhexyl phthalate (DOP), di-n-octyl phthalate (DNOP), di-i-octyl phthalate (DCapP), (79 alkyl) phthalate (D79P), di-i-decyl phthalate (DIDP), ditridecyl phthalate (DTDP), dicyclohexyl phthalate (DCHP), butylbenzyl phthalate (BBP), ethylphthalylethyl glycolate (EPEG) and butylphthalylbutyl glycolate (BPBG); aliphatic dibasic acid ester-substrated plasticizers such as di-2-ethylhexyl adipate (DOA), di-(methylcyclohexyl)adipate, diisodecyl adipate (DIDA), di-n-hexyl azelate (DNHZ), di-2-ethylhexyl azelate (DOZ), dibutyl sebacate (DBS) and 2-ethylhexyl sebacate (DOS); citric acid ester-substrated plasticizers such as triethyl citrate (TEC), tributyl citrate (TBC), acetyltriethyl citrate (ATEC) and acetyltributyl citrate (ATBC); epoxy-substrated plasticizers such as epoxified soybean oil; and phosphoric acid ester-substrated plasticizers such as tributyl phosphate (TBP), triphenyl phosphate (TPP), tricresyl phosphate (TCP) and tripropyleneglycol phosphate.

Examples of photopolymerization initiators for the initiator system include 1,3-di(t-butyldioxycarbonyl) benzophenone, 3,3',4,4'-tetrakis(t-butyldioxycarbonyl) benzophenone, N-phenylglycine, 2,4,6-tris(trichloromethyl)-s-triazine, 3-phenyl-5-isooxazone, 2-mercaptobenzimidazole, and imidazole dimers. From the standpoint of stability of the recorded hologram, the photopolymerization initiator is preferably subjected to decomposition treatment after hologram recording. For example, ultraviolet radiation is preferred for easier decomposition of organic peroxide systems.

Examples of sensitizing dyes include thiopyrillium salt dyes, melocyanin dyes, quinoline dyes, styrylquinoline dyes, ketocoumarin dyes, thioxanthene dyes, xanthene dyes, oxonol dyes, cyanine dyes, rhodamine dyes, pyrillium ion dyes and diphenyliodonium ion dyes which absorb light at 350-600 nm. The sensitizing dye may also absorb light in the wavelength regions of less than 350 nm or greater than 600 nm.

Matrix polymers which may be used include polymethacrylic acid esters and their partial hydrolysates, polyvinyl acetate and its hydrolysates, polyvinyl alcohol and its partial acetalized products, triacetyl cellulose, polyisoprene, polybutadiene, polychloroprene, siliconee rubber, polystyrene, polyvinylbutyral, polyvinyl chloride, chlorinated polyethylene, chlorinated polypropylene, poly-N-vinylcarbazole and its derivatives, poly-N-vinylpyrrolidone and its derivatives, copolymers of styrene and maleic anhydride and their half-esters, copolymers wherein at least one of the copolymer components is selected from the group of copolymerizable monomers consisting of acrylic acid, acrylic acid esters, methacrylic acid, methacrylic acid esters, acrylamide, acrylonitrile, ethylene, propylene, vinyl chloride and vinyl acetate, as well as mixtures thereof. Preferred are polyisoprene, polybutadiene, polychloroprene, polyvinyl alcohol, and the partially acetalized polyvinyl alcohols, polyvinyl acetal and polyvinyl butyral, polyvinyl acetate, ethylene-vinyl acetate copolymer, vinyl chloride-vinyl acetate copolymer, and mixtures thereof.

The step for stabilization of the recorded hologram may be a step involving monomer shifting by heat, and for this purpose it is necessary for the matrix polymer to be suitable for monomer shifting, preferably with a relatively low glass transition point.

The photopolymerizable compound is used at a proportion of 10 parts by weight to 1000 parts by weight, and preferably 10 parts by weight to 100 parts by weight, to 100 parts by weight of the binder resin.

The photopolymerization initiator is used at a proportion of 1 part by weight to 10 parts by weight, and preferably 5 parts by weight to 10 parts by weight, to 100 parts by weight of the binder resin.

The sensitizing dye is used at a proportion of 0.01 part by weight to 1 part by weight, and preferably 0.01 part by weight to 0.5 part by weight, to 100 parts by weight of the binder resin.

As additional photosensitive material components there may be mentioned various non-ionic surfactants, cationic surfactants and anionic surfactants.

These hologram recording materials are prepared as coating solutions to a solid portion of 15%-25%, using solvents such as acetone, methyl ethyl ketone, methyl isobutyl ketone, cyclohexanone, benzene, toluene, xylene, chlorbenzene, tetrahydrofuran, methylcellosolve, ethylcellosolve, methylcellosolve acetate, ethylcellosolve acetate, ethyl acetate, 1,4-dioxane, 1,2-dichloroethane, dichlormethane, chloroform, methanol, ethanol, isopropanol, etc., or mixtures thereof. The thickness of the hologram recording layer is 0.1 μm-50 μm, and preferably 5 μm-20 μm.

An example of such a hologram recording material is Omnidex 352,706 by DuPont.

The recording light for the volume hologram layer of the invention may be, for example, light of 532 nm wavelength from a LD laser, light of 337.5 nm, 350.7 nm or 356.4 nm wavelength from a krypton laser, light of 351.1 nm or 368.8 nm wavelength from an argon laser, light of 332.4 nm wavelength from a neon laser or light of 325.0 nm wavelength from a cadmium laser, or in the visible range, light of 514.5 nm, 488 nm or 457.9 nm wavelength from an argon laser or light of 647.1 nm, 568.2 nm or 520.8 nm from a krypton laser; the monochromatic hologram or color hologram is hologram-recorded by exposure to one wavelength among these wavelengths which is capable of exciting the photopolymerization initiator.

The volume hologram layer of the invention (this will hereunder refer to the volume hologram layer in its hologram-recorded state in cases where the volume hologram layer is defined by different properties) has a glass transition point of 30° C.-70° C., and preferably 35° C.-60° C.

The dynamic storage elastic modulus of the volume hologram layer of the invention is one of the properties reflecting the hardness of the volume hologram layer, and the following measuring apparatus and measuring method are employed.

Measuring sample: hologram recording film: A volume hologram film prepared by hologram recording on a laminated film consisting of a PET film/volume hologram layer/polyvinyl chloride film or PET film laminate, and releasing the PET film and polyvinyl chloride film or PET film.

In the case where the sample to be measured comprises a laminate of a hologram layer and an adhesive layer, only the hologram layer in the form of film is separated from the laminate to measure by the film tension method mentioned below. Parallel plate method can also be used by separating the hologram layer and rolling up the separated layer.

Measuring apparatus: Solid Viscoelasticity Analyzer RSA-II, product of Rheometrics Measuring attachment (mode): Film tension Measuring frequency: Temperature dependency measured at 6.28 rad/s Measuring temperature: −50° C. to 100° C.

Measuring method:

(1) The sample is set in a film tension measuring frame.

(2) The temperature dependency at 6.28 rad/s is measured in a temperature range of −50° C. to 100° C., and the temperature dependency data is used to determine the dynamic storage elastic modulus (E', Pa) at 25° C. and 50° C. 25° C. was selected from the viewpoint of comparison with the hardness at room temperature, and 50° C. was selected from the viewpoint of comparison with the hardness during storage by warehousing, etc. in summertime.

The volume hologram layer of the invention has a dynamic storage elastic modulus of $5 \times 10^5$ Pa to $5 \times 10^7$ Pa at 50° C.

The half-width of diffraction light in the volume hologram recorded in the volume hologram layer of the invention is no greater than 30 nm. Volume holograms recorded using color tuning films, when the half-width of diffraction light in the volume hologram is greater than 30 μm, are less prone to spotty hologram flaws under pressure, for reasons which are not fully understood but will be explained below by way of reference examples. According to the invention, it is particularly effective to use color Lippmann holograms and monochrome holograms wherein the half-width of diffraction light of the volume hologram is 30 nm or less.

The adhesive layers 33, 34 will now be explained. As adhesive layers there may be mentioned acryl resins and acrylic acid ester resins and their copolymers, styrene-butadiene copolymer, natural rubber, casein, gelatin, rosin esters, terpene resins, phenolic resins, styrene-substrated resins, croman-indene resin, polyvinyl ether, siliconee resins, etc. as well as—cyanoacrylate-substrated, siliconee-substrated, maleimide-substrated, styrol-substrated, polyolefin-substrated, resorcinol-substrated and polyvinyl ether-substrated adhesives. The adhesive layer may also have an isocyanate-substrated crosslinking agent or metal chelate-substrated crosslinking agent added thereto for its use. It may also be formed using a so-called "two-part crosslinkable adhesive". The thickness of the adhesive layer may be from 4 μm to 20 μm.

The maximum logarithmic decrement in measurement of the surface viscoelasticity of the second adhesive layer between the volume hologram layer and the surface protective film according to the invention is one of the properties reflecting the hardness of the adhesive layer, and it is specified by the value of the surface viscoelasticity measured by the pendulum type rigidity test described below.

The following measuring apparatus and measuring method are employed.

Measuring sample: After coating a Separator A ("SP-PETO5", product of Tokyo Cellophane, KK.) with the adhesive to a dry film thickness of 15 μm, a Separator B ("SP-PETO2", product of Tokyo Cellophane, KK.) is laminated on the coated side and allowed to age for one week at room temperature. For the measurement, the adhesive film is cut to a desired size, Separator A is peeled, the adhesive layer is transfered to a smooth SUS, and then Separator B is peeled off prior to measurement.

Measuring apparatus: Rigid body pendulum-type property tester, RPT-α-100 (Tohoku Denshi, KK.)

Measuring temperature: −50° C. to 100° C.

Shape of measured section: rbp20, Frame type: frb-10

Consistent performance: 1230

Measuring method:

(1) The sample is set.

(2) Pendulum adjustment: The amplitude and cycle (desired value) are matched.

(3) The maximum logarithmic decrement obtained (Δmax) is determined.

Figure 11:
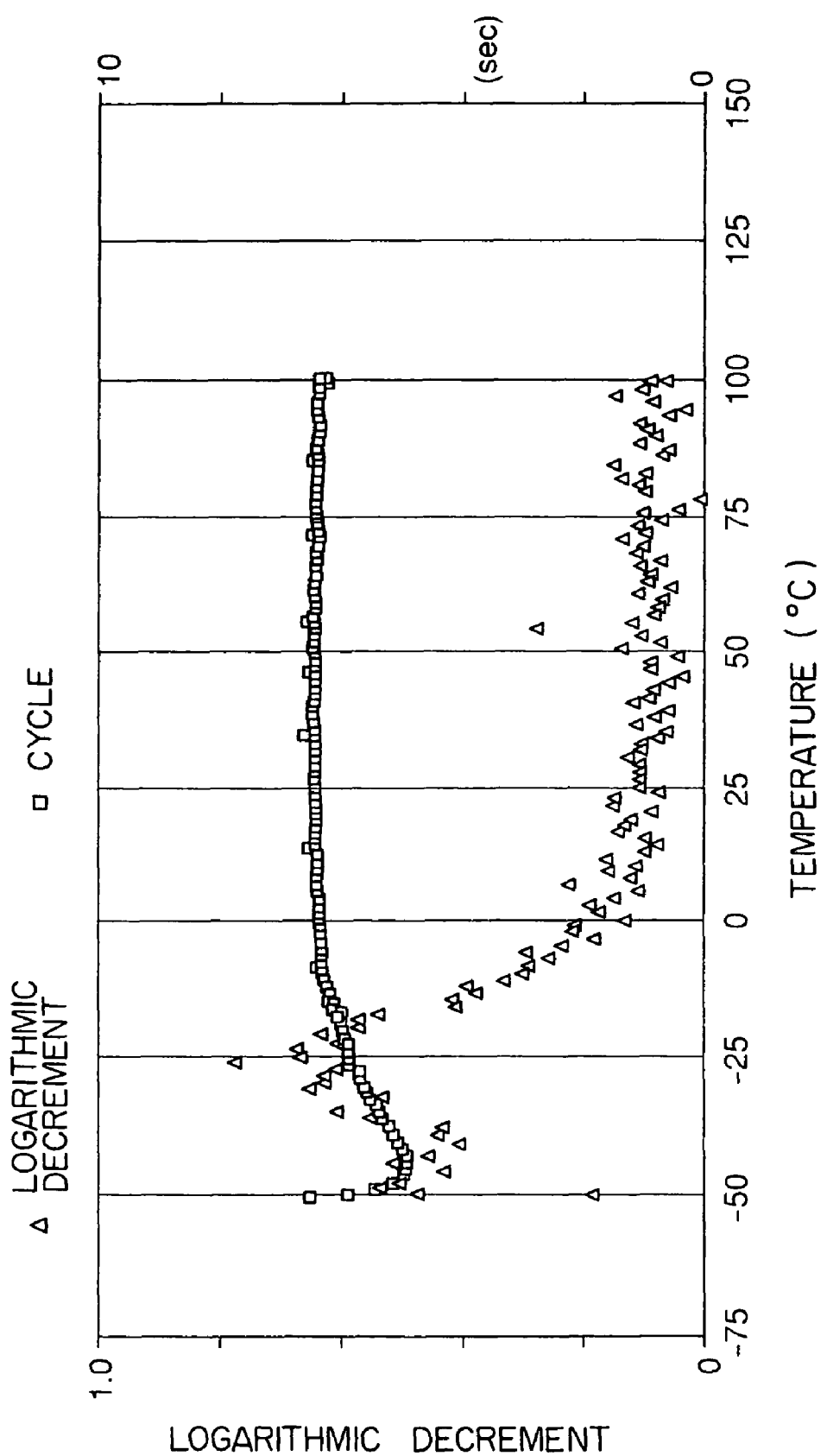
FIG. 11 shows the logarithmic decrement for the second adhesive layer.

An example of data obtained for the maximum logarithmic decrement (Δmax) is shown in FIG. 11. Here, the symbol "Δ" indicates the logarithmic decrement, and " " indicates the cycle; the maximum logarithmic decrement (Δmax) was 0.776 for the second adhesive layer formed in Example 3 described below.

The second adhesive layer in the volume hologram laminate of the invention can be specified by the maximum logarithmic decrement obtained by measurement of the surface viscoelasticity in a pendulum type rigidity test. The maximum logarithmic decrement is produced during glass transition, and its value is less than 1, preferably less than 1 down to 0.08, or at least 2, preferably 2-4, because when it is 1 or greater or less than 2 the spotty hologram flaws under pressurized conditions increase drastically.

The surface protective film 36 in the volume hologram laminate of the invention is transparent, and will typically be a resin, for example a polyethylene film, polypropylene film, polyethylene fluoride-substrated film, polyvinylidene fluoride film, polyvinyl chloride film, polyvinylidene chloride film, ethylene-vinyl alcohol film, polyvinyl alcohol film, polymethyl methacrylate film, polyether sulfone film, polyetherether ketone film, polyamide film, tetrafluoroethylene-perfluoroalkyl vinyl ether copolymer film, a polyester film such as a polyethylene terephthalate film, or a polyimide film, and the film thickness is 2 µm-200 µm, and preferably 10 µm-50 µm.

Though not shown in the drawing, if necessary the surface protective film may be subjected to hard coat treatment for the purpose of increasing the protective property of the surface protective film surface. The hard coat treatment may involve a dipping application, spray application or roll coat application method in a siliconee system, fluorinated siliconee system, melamine alkyd system or urethane-acrylate system (ultraviolet curing type), to a film thickness of 1 µm-50 µm, and preferably 3 µm-25 µm.

Also not shown, the surface protective film 36 surface or hard coat treated surface may be further subjected to release treatment. The release treatment may be accomplished by a method of dipping application, spray application or roll coat application in a fluorine substrated release agent, siliconee-substrated release agent, stearic acid-substrated release agent, wax-substrated release agent or the like.

Figure 10:
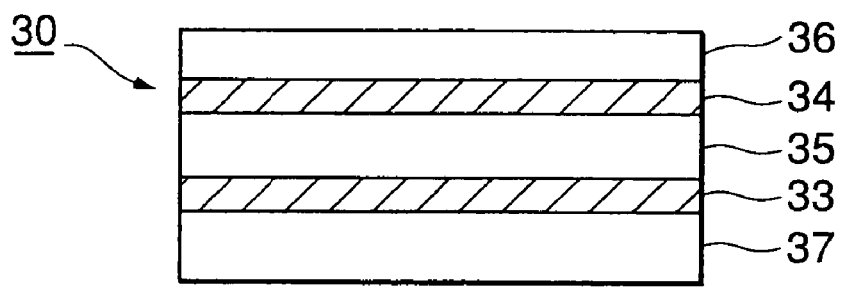

The volume hologram laminate-fabricating label used for fabrication of the volume hologram laminate of the invention is shown in FIG. 10 by its cross-sectional layer structure. Here, 30 is the volume hologram laminate-fabricating label, 37 is a peel sheet, and the same references numerals as in FIG. 9 indicate like elements.

The volume hologram laminate-fabricating label of the invention is used to fabricate the aforementioned volume hologram laminate, and as shown in the drawing, it has a first adhesive layer 33, volume hologram layer 35, second adhesive layer 34 and surface protective film 36 laminated on a peel sheet 37.

While the volume hologram laminate-fabricating label of the invention has the structure as shown in FIG. 10 wherein the volume hologram layer 35 is laminated on the peel sheet 37 via the first adhesive layer 33, it may also have a structure wherein the volume hologram layer 35 is laminated on the peel sheet 37 via double-sided adhesive tape, in which case it may have an adhesive layer, a plastic film such as a transparent or colored polyethylene terephthalate film, a first adhesive layer 33, a volume hologram layer 35, a second adhesive layer 34 and a surface protective film 36 laminated in that order on the peel sheet 37.

The peel sheet 37 used may be a commonly employed peel sheet, or a releasable film prepared by release-treating the polyethylene terephthalate film surface with a fluorine-substrated release agent or siliconee-substrated release agent, and the side of the peel sheet not facing the adhesive layer may be release-treated to avoid blocking by adhesive which has seeped from the sides of the label. Also, in order to permit peel of the laminate from the peel sheet at appropriate sizes, the laminate may be subjected to "half-cutting", or perforations or other cuts may be made in the peel sheet.

The label 30 is laminated on the substrate of the volume hologram laminate from the side of the first adhesive layer 33 after peeling off the peel sheet 37, to thus fabricate the volume hologram laminate shown in FIG. 9.

Fourth Invention

Figure 13:
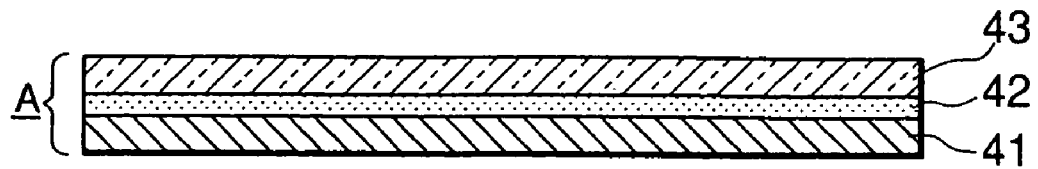

The basic form of the volume hologram laminate according to the invention fourth invention is shown cross-sectionally in FIG. 13. The volume-type hologram laminate A according to the invention as shown in FIG. 13 is characterized by comprising a hologram layer 41 wherein a transparent protective film 43 is laminated via a transparent hot-melt adhesive layer 42; here, using the hot-melt adhesive 42 to attach the transparent protective film 43 to the hologram layer 41 improves the storage stability of the volume-type hologram laminate under increased temperature or pressure.

The form shown in FIG. 14 has a construction wherein a transparent or colored adhesive layer 44 and a substrate 45 are laminated in that order on the back side of the hologram layer 41 of a volume-type hologram laminate A, the substrate 45 of which is explained below, and this form is useful for such items as premium sale goods and ID cards; for example, if a black-colored adhesive layer 44 is used on the back side of the hologram layer 41, the improved color contrast provides an effect which renders the hologram image more visible. If a transparent adhesive layer 44 is used on the back side of the hologram layer 41, it becomes possible to distinguish patterns, photographs and other images on the attached substrate, for even better designs. Also, if a hot-melt adhesive layer 44 is used on the back side, the substrate 45 may be peeled off for iron printing of the volume-type hologram laminate A onto paper, clothing and other articles.

Figure 14:
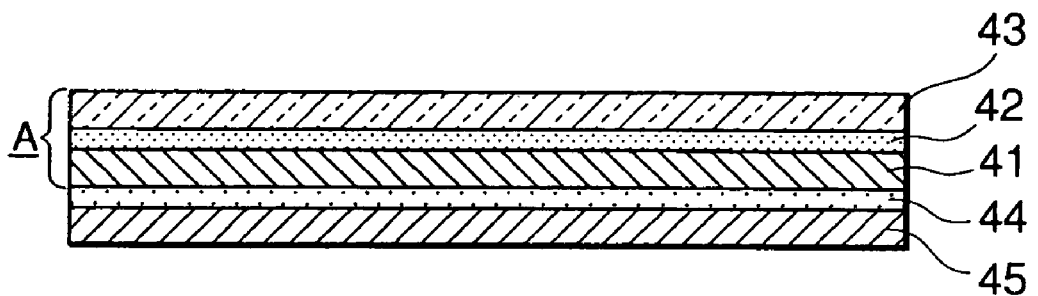
Figure 15:
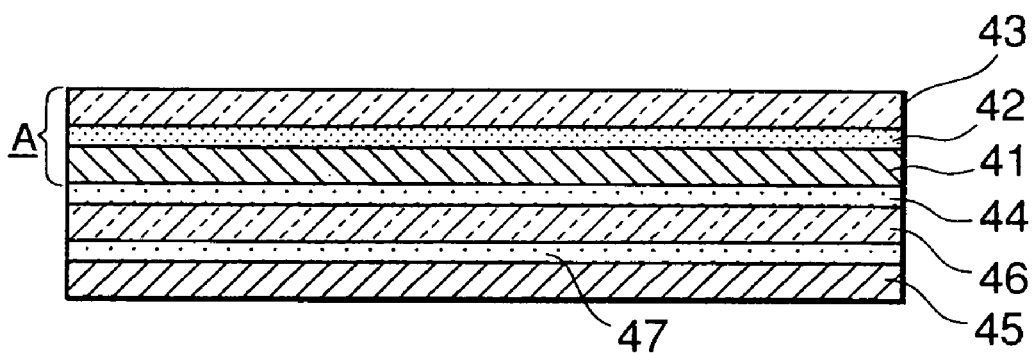

The form shown in FIG. 15 has a construction wherein an adhesive layer 44, a transparent or colored adhesive layer 44, an adhesive layer or hot-melt adhesive layer 47 and a substrate 45 are laminated in that order on the back side of the hologram layer 41 of a volume-type hologram laminate A; in addition to the effect of the form shown in FIG. 14 there is provided an effect of increased strength of the laminate as a whole due to the film 46 lying between the adhesive layer 44 and the adhesive layer or hot-melt adhesive layer 47, with the added advantage that the adhesive or hot-melt adhesive layer 47 on the substrate side may be selected as desired.

Figure 16:
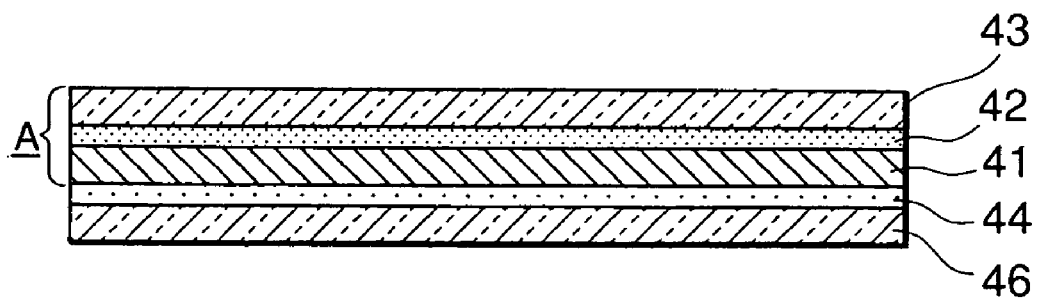

The form shown in FIG. 16 has a construction wherein an adhesive layer 44 and a transparent or colored film 46 are laminated in that order on the back side of the hologram layer 41 of the volume-type hologram laminate A; this is not intended for attachment onto other articles but is primarily used for trading cards and the like, and it provides a partly similar effect as the form of FIG. 14 and FIG. 15.

By making the substrate 45 of FIGS. 14 and 15 a releasable film, a label-type volume-type hologram laminate is produced, and the release film 45 may be peeled off for easy attachment of the volume-type hologram laminate A onto other articles, such as paper, cloth, plastic molds, metal products and the like, either with the volume-type hologram laminate A or layer A including layer 44 or 46 shown in FIG. 14.

The substrate 45 of the volume-type hologram laminate of the invention shown in FIG. 14 can be a film or sheet made of paper, synthetic paper, synthetic resin or metal, and may be in various forms including that of a sheet such as an examination admission ticket, that of a card such as an ID card, or that of a small booklet such as a passport; a hologram body in which a mono-color or full-color image are recorded can be laminated onto a picture of personal features or landscaps. When used as a color filter for a liquid crystal display element, a glass panel or electrode layer will serve as the substrate in a liquid crystal cell.

The volume-type hologram laminate of the invention shown in FIG. 14 has a construction wherein the volume-type hologram laminate A is laminated on the substrate 45 via an adhesive layer 44, but it may also have a construction wherein the volume-type hologram laminate A is laminated on the substrate 45 via double-sided adhesive tape, in which case it may have the adhesive layer 44, the volume-type hologram layer 41, the hot-melt adhesive layer 42 and the transparent protective film 43 formed in that order on the substrate 45, via an adhesive layer 47 and a plastic film such as a transparent or colored polyethylene terephthalate film, as shown in FIG. 15.

The volume-type hologram layer 41 can be easily fabricated by coating a support film with a volume-type hologram recording material and then recording in the layer an interference pattern corresponding to the wavefront of light from an object by transmittivity modulation or refractivity modulation, or for reproduction, by joining with a volume-type hologram plate and developing by exposure to light. The volume-type hologram layer is a photosensitive material for volume phase-type hologram recording with dry processing which comprises a matrix polymer, a photopolymerizable compound, a photopolymerization initiator, a sensitizing dye and if necessary an added plasticizer.

As photopolymerizable compounds there may be mentioned the photopolymerizable and photocrosslinkable monomers, oligomers and prepolymers mentioned below which have at least one ethylenic unsaturated bond per molecule, as well as their mixtures, examples of which include unsaturated carboxylic acids and their salts, esters of unsaturated carboxylic acids and aliphatic polyhydric alcohol compounds, and amide-bonded compounds of unsaturated carboxylic acids and aliphatic polyvalent amine compounds.

As specific examples of unsaturated carboxylic acid monomers there may be mentioned acrylic acid, methacrylic acid, itaconic acid, crotonic acid, isocrotonic acid, maleic acid and their halogen-substituted unsaturated carboxylic acids, such as chlorinated unsaturated carboxylic acids, brominated unsaturated carboxylic acids and fluorinated unsaturated carboxylic acids. Salts of unsaturated carboxylic acids include sodium and potassium salts of the aforementioned acids.

As specific examples of ester monomers of aliphatic polyhydric alcohol compounds and unsaturated carboxylic acids there may be mentioned acrylic acid esters such as ethyleneglycol diacrylate, triethyleneglycol diacrylate, 1,3-butanediol diacrylate, tetramethyleneglycol diacrylate, propyleneglycol diacrylate, neopentylglycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethyleneglycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, polyester acrylate oligomer, 2-phenoxyethyl acrylate, 2-phenoxyethyl methacrylate, phenolethoxylate monoacrylate, 2-(p-chlorophenoxy)ethyl acrylate, p-chlorophenyl acrylate, phenyl acrylate, 2-phenylethyl acrylate, bisphenol A (2-acryloxyethyl)ether, ethoxylated bisphenol A diacrylate, 2-(1-naphthyloxy)ethyl acrylate, o-biphenyl methacrylate and o-biphenyl acrylate.

Methacrylic acid esters include tetramethyleneglycol dimethacrylate, triethyleneglycol dimethacrylate, neopentylglycol dimethacrylate, trimethylolpropane trimethacrylate, trimethylolethane trimethacrylate, ethyleneglycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis-[p-(3-methacryloxy-2-hydroxypropoxy)phenyl]dimethylmethane, bis-[p-(acryloxyethoxy)phenyl]dimethylmethane, 2,2-bis(4-methacryloyloxyphenyl)propane and 2-naphthyl methacrylate.

As itaconic acid esters there may be mentioned ethyleneglycol diitaconate, propyleneglycol diitaconate, 1,3-butanediol diitaconate, 1,4-butanediol diitaconate, tetramethyleneglycol diitaconate, pentaerythritol diitaconate and sorbitol tetraitaconate. As crotonic acid esters there may be mentioned ethyleneglycol dicrotonate, tetramethyleneglycol dicrotonate, pentaerythritol dicrotonate and sorbitol tetracrotonate. As isocrotonic acid esters there may be mentioned ethyleneglycol diisocrotonate, pentaerythritol diisocrotonate and sorbitol tetraisocrotonate.

As maleic acid esters there may be mentioned ethyleneglycol dimaleate, triethyleneglycol dimaleate, pentaerythritol dimaleate and sorbitol tetramaleate. As halogenated unsaturated carboxylic acids there may be mentioned 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, 2,4,6-tribromophenyl methacrylate, dibromoneopentyl dimethacrylate (trade name: NK ESTER DBN, Shin Nakamura Kagaku Kogyo, KK.), dibromopropyl acrylate (trade name: NK ESTER A-DBP, Shin Nakamura Kagaku Kogyo, KK.), dibromopropyl methacrylate (trade name: NK ESTER DBP, Shin Nakamura Kagaku Kogyo, KK.), methacrylic chloride, 2,4,6-trichlorophenyl methacrylate, p-chlorostyrene, methyl-2-chloroacrylate, ethyl-2-chloroacrylate, n-butyl-2-chloroacrylate, tribromophenol acrylate and tetrabromophenol acrylate.

As specific examples of amide monomers of unsaturated carboxylic acids and aliphatic polyvalent amine compounds there may be mentioned methylene bisacrylamide, methylene bismethacrylamide, 1,6-hexamethylene bisacrylamide, 1,6-hexamethylene bismethacrylamide, diethylenetriamine trisacrylamide, xylylene bisacrylamide, xylylene bismethacrylamide, N-phenylmethacrylamide and diacetone acrylamide.

As additional examples there may be mentioned the polyisocyanate compounds with at least 2 isocyanate groups per molecule described in Japanese Examined Patent Publication No. 48-41708, and vinyl urethane compounds with at least 2 polymerizable vinyl groups per molecule with an added hydroxyl group-containing vinyl monomer represented by the following general formula:

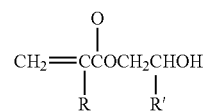

where R and R' represent hydrogen or methyl groups.

There may also be mentioned the urethane acrylates mentioned in Japanese Unexamined Patent Publication No. 51-37193, and the polyester acrylates and polyfunctional acrylates and methacrylates of epoxy resins and (meth)acrylic acid such as mentioned in Japanese Unexamined Patent Publication No. 48-64183, Japanese Examined Patent Publication No. 49-43191 and Japanese Examined Patent Publication No. 52-30490.

The photocurable monomers and oligomers listed in the Journal of the Nihon Secchaku Association, vol. 20, No. 7, pp. 300-308 may also be used.

Also, as phosphorus-containing monomers there may be mentioned mono(2-acryloyloxyethyl) acid phosphate (trade name: Light Ester PA, product of Kyoeisha Yushi Kagaku Kogyo, KK.) and mono(2-methacryloyloxyethyl) acid phosphate (trade name: Light Ester PM, product of Kyoeisha Yushi Kagaku Kogyo, KK.), as well as the epoxy acrylate substrated products with the trade names of Lipoxy VR-60 (Showa Polymer, KK.) and Lipoxy VR-90 (Showa Polymer).

Additional ones are those with the trade names of NK Ester M-230G (product of Shin Nakamura Kagaku Kogyo, KK.) and NK Ester 23G (Shin Nakamura Kagaku Kogyo, KK.).

There may also be mentioned the triacrylates having the following structural formulas:

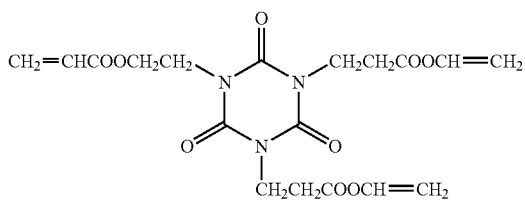

(trade name: Aronix M-315 by Toa Gosei Kagaku Kogyo, KK.)

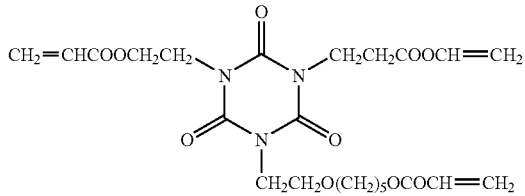

(trade name: Aronix M-325 by Toa Gosei Kagaku Kogyo, KK.), as well as 2,2'-bis(4-acryloxy diethoxyphenyl)propane (trade name: NK Ester A-BPE-4 by Shin Nakamura Kagaku, KK.) and tetramethylolmethane tetraacrylate (trade name: NK Ester A-TMMT by Shin Nakamura Kagaku, KK.).

As plasticizers to be added when necessary there may be mentioned polyhydric alcohols such as ethylene glycol, diethylene glycol, triethylene glycol, glycerin and trimethylol propane; phthalic acid ester-substrated plasticizers such as dimethyl phthalate (DMP), diethyl phthalate (DEP), dibutyl phthalate (DBP), heptyl nonyl phthalate (HNP), 2-ethylhexyl phthalate (DOP), di-n-octyl phthalate (DNOP), di-i-octyl phthalate (DCapP), (79 alkyl) phthalate (D79P), di-i-decyl phthalate (DIDP), ditridecyl phthalate (DTDP), dicyclohexyl phthalate (DCHP), butylbenzyl phthalate (BBP), ethylphthalylethyl glycolate (EPEG) and butylphthalylbutyl glycolate (BPBG); aliphatic dibasic acid ester-substrated plasticizers such as di-2-ethylhexyl adipate (DOA), di-(methylcyclohexyl)adipate, diisodecyl adipate (DIDA), di-n-hexyl azelate (DNHZ), di-2-ethylhexyl azelate (DOZ), dibutyl sebacate (DBS) and 2-ethylhexyl sebacate (DOS); citric acid ester-substrated plasticizers such as triethyl citrate (TEC), tributyl citrate (TBC), acetyltriethyl citrate (ATEC) and acetyltributyl citrate (ATBC); epoxy-substrated plasticizers such as epoxified soybean oil; and phosphoric acid ester-substrated plasticizers such as tributyl phosphate (TBP), triphenyl phosphate (TPP), tricresyl phosphate (TCP) and tripropyleneglycol phosphate.

Examples of photopolymerization initiators for the initiator system include 1,3-di(t-butyldioxycarbonyl)benzophenone, 3,3',4,4'-tetrakis(t-butyldioxycarbonyl) benzophenone, N-phenylglycine, 2,4,6-tris(trichloromethyl)-s-triazine, 3-phenyl-5-isooxazone, 2-mercaptobenzimidazole, and imidazole dimers. From the standpoint of stability of the recorded hologram, the photopolymerization initiator is preferably subjected to decomposition treatment after hologram recording. For example, ultraviolet radiation is preferred for easier decomposition of organic peroxide systems.

Examples of sensitizing dyes include thiopyrillium salt dyes, melocyanin dyes, quinoline dyes, styrylquinoline dyes, ketocoumarin dyes, thioxanthenedyes, xanthene dyes, oxonol dyes, cyanine dyes, rhodamine dyes, pyrillium ion dyes and diphenyliodonium ion dyes which absorb light at 350-600 nm. The sensitizing dye may also absorb light in the wavelength regions of less than 350 nm or greater than 600 nm.

Matrix polymers which may be used include polymethacrylic acid esters and their partial hydrolysates, polyvinyl acetate and its hydrolysates, polyvinyl alcohol and its partial acetalized products, triacetyl cellulose, polyisoprene, polybutadiene, polychloroprene, siliconee rubber, polystyrene, polyvinylbutyral, polyvinyl chloride, chlorinated polyethylene, chlorinated polypropylene, poly-N-vinylcarbazole and its derivatives, poly-N-vinylpyrrolidone and its derivatives, copolymers of styrene and maleic anhydride and their half-esters, copolymers wherein at least one of the copolymer components is selected from the group of copolymerizable monomers consisting of acrylic acid, acrylic acid esters, methacrylic acid, methacrylic acid esters, acrylamide, acrylonitrile, ethylene, propylene, vinyl chloride and vinyl acetate, as well as mixtures thereof. Preferred are polyisoprene, polybutadiene, polychloroprene, polyvinyl alcohol, and the partially acetalized polyvinyl alcohols, polyvinyl acetal and polyvinyl butyral, polyvinyl acetate, ethylene-vinyl acetate copolymer, vinyl chloride-vinyl acetate copolymer, and mixtures thereof.

The step for stabilization of the recorded hologram may be a step involving monomer shifting by heat, and for this purpose it is necessary for the matrix polymer to be suitable for monomer shifting, preferably with a relatively low glass transition point. The photopolymerizable compound is used at a proportion of 10 parts by weight to 1000 parts by weight, and preferably 10 parts by weight to 100 parts by weight, to 100 parts by weight of the binder resin.

The photopolymerization initiator is used at a proportion of 1 part by weight to 10 parts by weight, and preferably 5 parts by weight to 10 parts by weight, to 100 parts by weight of the binder resin. The sensitizing dye is used at a proportion of 0.01 part by weight to 1 part by weight, and preferably 0.01 part by weight to 0.5 part by weight, to 100 parts by weight of the binder resin. As additional photosensitive material components there may be mentioned various non-ionic surfactants, cationic surfactants and anionic surfactants.

These hologram recording materials are prepared as coating solutions to a solid portion of 15%-25%, using solvents such as acetone, methyl ethyl ketone, methyl isobutyl ketone, cyclohexanone, benzene, toluene, xylene, chlorbenzene, tetrahydrofuran, methylcellosolve, ethylcellosolve, methylcellosolve acetate, ethylcellosolve acetate, ethyl acetate, 1,4-dioxane, 1,2-dichloroethane, dichlormethane, chloroform, methanol, ethanol, isopropanol, etc., or mixtures thereof. The thickness of the hologram recording layer is 0.1 μm-50 μm, and preferably 5 μm-20 μm. An example of such a hologram recording material is Omnidex 352,706 by DuPont.

The recording light for the volume-type hologram layer of the invention may be, for example, light of 532 nm wavelength from a LD laser, light of 337.5 nm, 350.7 nm or 356.4 nm wavelength from a krypton laser, light of 351.1 nm or 368.8 nm wavelength from an argon laser, light of 332.4 nm wavelength from a neon laser or light of 325.0 nm wavelength from a cadmium laser, or in the visible range, light of 514.5 nm, 488 nm or 457.9 nm wavelength from an argon laser or light of 647.1 nm, 568.2 nm or 520.8 nm from a krypton laser;

the monochromatic hologram or color hologram is hologram-recorded by exposure to one wavelength among these wavelengths which is capable of exciting the photopolymerization initiator.

The volume-type hologram layer of the invention (this will hereunder refer to the volume-type hologram layer in its hologram-recorded state in cases where the volume-type hologram layer is defined by different properties) has a glass transition point of 30° C.-70° C., and preferably 35° C.-60° C.

The dynamic storage elastic modulus of the volume-type hologram layer of the invention is one of the properties reflecting the hardness of the volume-type hologram layer, and the following measuring apparatus and measuring method are employed.

Measuring sample: hologram recording film: A volume-type hologram film prepared by hologram recording on a laminated film consisting of a PET film/volume-type hologram layer/polyvinyl chloride film or PET film laminate, and releasing the PET film and polyvinyl chloride film or PET film.

In the case where the sample to be measured comprises a laminate of a hologram layer and an adhesive layer, only the hologram layer in the form of film is separated from the laminate to measure by the film tension method mentioned below. Parallel plate method can also be used by separating the hologram layer and rolling up the separated layer.

Measuring apparatus: Solid Viscoelasticity Analyzer RSA-II, product of Rheometrics Measuring attachment (mode): Film tension Measuring frequency: 6.28 rad/s Measuring temperature: −50° C. to 100° C.

Measuring method:

(1) The sample is set in a film tension measuring frame.

(2) The temperature dependency at 6.28 rad/s is measured in a temperature range of −50° C. to 100° C., and the temperature dependency data is used to determine the dynamic storage elastic modulus (E', Pa) at 25° C. and 50° C. 25° C. was selected from the viewpoint of comparison with the hardness at room temperature, and 50° C. was selected from the viewpoint of comparison with the hardness during storage by warehousing, etc. in summertime. The volume-type hologram layer of the invention has a dynamic storage elastic modulus of $5 \times 10^5$ Pa to $5 \times 10^7$ Pa at 50° C.

The half-width of diffraction light in the volume-type hologram recorded in the volume-type hologram layer of the invention is no greater than 30 nm. Volume-type holograms recorded using color tuning films, when the half-width of diffraction light in the volume-type hologram is greater than 30 μm, are less prone to spotty hologram flaws under pressure, for reasons which are not fully understood but will be explained below by way of reference examples. According to the invention, it is particularly effective to use color Lippmann holograms and monochrome holograms wherein the half-width of diffraction light of the volume-type hologram is 30 nm or less.

The hot-melt adhesive used for the invention may be a thermoplastic resin, for example an ethylene-vinyl acetate copolymer resin, polyamide resin, polyester resin, polyethylene resin, ethylene-isobutyl acrylate copolymer resin, butyral resin, resin of polyvinyl acetate or its copolymer, cellulose-substrated resin, polymethyl methacrylate-substrated resin, polyvinyl ether-substrated resin, polyurethane resin, polycarbonate resin, polypropylene resin, epoxy resin, phenol resin, SBS, SIS, SEBS, SEPS, and so forth, and the thickness of the layer formed from the hot-melt adhesive is 2-30 μm, and preferably 5-20 μm. The heat sealing layer may also be used at a heat sealing temperature of about 90-180° C.

By using a hot-melt adhesive as the laminating layer between the hologram layer 41 and the transparent protective film 43, the resulting volume-type hologram laminate A will be less prone to spotty hologram flaws when kept under pressurized conditions in a warehouse or the like. The reason for this is attributed to the relatively high glass transition point of the hot-melt adhesive and the hard property of the hot-melt adhesive layer 42 at normal temperature, whereby the effects of pressure from above are not transmitted to the hologram layer 41 due to the hot-melt adhesive layer 42. From this viewpoint, the glass transition point of the hot-melt adhesive is preferred to be as high as possible within a range not exceeding the heat sealing temperature.

The adhesive layers 44, 47 will now be explained. The adhesive layer may employ the aforementioned hot-melt adhesive. As adhesive layers there may be mentioned acryl resins and acrylic acid ester resins and their copolymers, styrene-butadiene copolymer, natural rubber, casein, gelatin, rosin esters, terpene resins, phenolic resins, styrene-substrated resins, croman-indene resin, polyvinyl ether, siliconee resins, etc. as well as—cyanoacrylate-substrated, siliconee-substrated, maleimide-substrated, styrol-substrated, polyolefin-substrated, resorcinol-substrated and polyvinyl ether-substrated adhesives. The adhesive layer may also have an isocyanate-substrated crosslinking agent or metal chelate-substrated crosslinking agent added thereto for its use. It may also be formed using a so-called "two-part crosslinkable adhesive". The thickness of the adhesive layer may be from 4 μm to 20 μm.

The surface protective film 43 in the volume-type hologram laminate of the invention is transparent, and will typically be a resin, for example a polyethylene film, polypropylene film, polyethylene fluoride-substrated film, polyvinylidene fluoride film, polyvinyl chloride film, polyvinylidene chloride film, ethylene-vinyl alcohol film, polyvinyl alcohol film, polymethyl methacrylate film, polyether sulfone film, polyetherether ketone film, polyamide film, tetrafluoroethylene-perfluoroalkyl vinyl ether copolymer film, a polyester film such as a polyethylene terephthalate film, or a polyimide film, and the film thickness is 2 μm-200 μm, and preferably 10 μm-50 μm.

Though not shown in the drawing, if necessary the transparent protective film may be subjected to hard coat treatment for the purpose of increasing the protective property of the transparent protective film surface. The hard coat treatment may involve a dipping application, spray application or roll coat application method in a siliconee system, fluorinated siliconee system, melamine alkyd system or urethane-acrylate system (ultraviolet curing type), to a film thickness of 1 μm-50 μm, and preferably 3 μm-25 μm. Also not shown, the transparent protective film 43 surface or hard coat treated surface may be further subjected to release treatment. The release treatment may be accomplished by a method of dipping application, spray application or roll coat application in a fluorine substrated release agent, siliconee-substrated release agent, stearic acid-substrated release agent, wax-substrated release agent or the like.

When the volume-type hologram laminate of the invention is used as a label, a release sheet or peelable sheet is used as the substrate. The cross-sectional layer structure is as shown in FIG. 14 and FIG. 15. Here, 45 is a peel sheet (substrate), and the same references numerals as in FIG. 13 indicate like elements. As shown in FIG. 14, the label-type volume-type hologram laminate of the invention has an adhesive layer 44, volume-type hologram layer 41, hot-melt adhesive layer 42 and transparent protective film 43 laminated on a peel sheet 45.

The label-type volume-type hologram laminate of the invention may have the structure shown in FIG. 15 wherein the volume-type hologram laminate A is laminated on a release sheet 45 via double-sided adhesive tape, in which case it may have an adhesive layer 47, a plastic film such as a transparent or colored polyethylene terephthalate film 46, an adhesive layer 44, a volume-type hologram layer 41, a hot-melt adhesive layer 42 and a transparent protective film 43 laminated in that order on a release sheet 45.

The release sheet 45 used may be a commonly employed release sheet, or a releasable film prepared by release-treating the polyethylene terephthalate film surface with a fluorine-substrated release agent or siliconee-substrated release agent, and the side of the release sheet not facing the adhesive layer may be release-treated to avoid blocking by adhesive which has seeped from the sides of the label. Also, in order to permit peel of the laminate from the release sheet at appropriate sizes, the laminate may be subjected to "half-cutting", or perforations or other cuts may be made in the release sheet.

Example A1

Fabrication of Transparent Protective Film/Second Adhesive Layer/Silicone Separator Release Liner A siliconee separator ("SP-PETO5", 50 µm film thickness, product of Tokyo Cellophane, KK.) was coated with an adhesive solution having the following composition:

| | |
|---|---|
| Acrylic adhesive ("Nissetsu PE-118", Nihon Carbide Co.) | 100 pts. by wt. |
| Methyl ethyl ketone | 30 pts. by wt. |
| Toluene | 15 pts. by wt. |
| Ethyl acetate | 15 pts. by wt. |
| Isocyanate-substrated crosslinking agent ("Nissetsu CK-101", Nihon Carbide Co.) | 16 pts. by wt. | to an immediate dry film thickness of 15 µm using a comma coater. This was laminated with a polyethylene terephthalate film ("Lumira-T-60, 50 µm film thickness, product of Toray, KK.).

The dynamic storage elastic modulus of the adhesive layer at 25° C. was $1.4 \times 10^6$ Pa, and the dynamic storage elastic modulus at 50° C. was $7 \times 10^5$ Pa, as measured at 6.28 rad/s.

(Fabrication of Silicone Separator A/First Adhesive Layer/silicone Separator B)

Silicone separator A ("SP-PETO5", 50 µm film thickness, product of Tokyo Cellophane, KK.) was coated with an adhesive solution having the composition listed above to an immediate dry film thickness of 15 µm using a comma coater, and this was laminated with silicone separator B ("SP-PETO2", 50 µm film thickness, product of Tokyo Cellophane, KK.).

(Fabrication of Hologram Recorded Film)

After recording a color Lippmann hologram with lasers of wavelengths 476 nm, 532 nm and 647 nm on a hologram recording film (HRF800×001, product of DuPont Co.) comprising a polyethylene terephthalate film (PET film: 50 µm)/hologram recording material layer (15 µm film thickness)/PET film laminate, the PET film was peeled off and an adhesive sheet with a repeelable adhesive layer (H225E, product of Sanei Kaken, KK.) was laminated thereon prior to heat treatment at 120° C. for 24 minutes.

The glass transition point of the volume hologram layer was 46° C., and the dynamic storage elastic modulus at 50° C. with measurement at 6.28 rad/s was $6.28 \times 10^6$ Pa.

(Fabrication of Hologram Laminate)

The repeelable adhesive sheet was peeled off from the hologram recorded film obtained above, after which the silicone separator A was peeled off from the silicone separator A/first adhesive layer/silicone separator B prepared above, and the two were laminated together to obtain a PET film/hologram recorded material/first adhesive layer/silicone separator B laminate.

The PET film was peeled off from this laminate, the silicone separator was peeled off from the transparent protective film/second adhesive layer/silicone separator obtained above, and the two were laminated together to obtain a volume hologram laminate label according to the invention comprising the transparent protective film/second adhesive layer/hologram recorded material/first adhesive layer/silicone separator B. The spectral characteristics of the hologram were evaluated and the half-widths of diffraction lights at each diffraction peak were found to be 17-20 nm.

Next, the silicone separator B of the label was peeled off, and the label was attached to a sheet substrate and stored for 3 days under conditions of 50° C., 0.12 kg/cm².

The stored hologram was visually examined for hologram flaws under a triple-beam fluorescent tube (Highlumic N FL4EX-N-PK: product of Hitachi; peak wavelength: about 450 nm, 550 nm and 650 nm) at an angle where the flaws appeared darkest, and the hologram flaw level was 1.5, thus demonstrating excellent storage stability.

The flaw level was judged from a scale of 0 with absolutely no spotty hologram flaws, and the size (mm) and density (relatively value of 1-10) of the spots produced were determined visually and the product recorded as the flaw level. Samples with a flaw level of 3 or less were judged as having excellent storage stability.

The detailed meaning of the flaw level values are as follows:

0-3: Hologram flaw level is under the permissible level even by an examination with a triple-beam fluorescent tube. No flaw is observed under an ordinary fluorescent tube.

3-6: Flaws are slightly observed by an examination with a triple-beam fluores an ordinary fluorescent tube. The quality is within a marginal level. Hologram flaw level is under the permissible level under an ordinary fluorescent tube.

6-9: Flaws are aparently observed by an examination with a triple-beam fluorescent tube. Flaws are observed even under an ordinary fluorescent tube.

9 or more: Flaws are aparently observed both under a triple-beam fluorescent tube and an ordinary fluorescent tube.

Comparative Example A1

Fabrication of Transparent Protective Film/Second Adhesive Layer/Silicone Separator A transparent protective film/second adhesive layer/silicone separator was fabricated in the same manner as Example A1, except that the silicone separator ("SP-PETO5", 50 µm film thickness, product of Tokyo Cellophane, KK.) was coated with the following composition:

| Acrylic adhesive ("Nissetsu PE-118", Nihon Carbide Co.) | 100 pts. by wt. |
|---|---|
| Methyl ethyl ketone | 30 pts. by wt. |
| Toluene | 15 pts. by wt. |
| Ethyl acetate | 15 pts. by wt. |

Upon measuring the dynamic storage elastic modulus of the second adhesive layer in the same manner as Example A1, the dynamic storage elastic modulus at 25° C. was $2.0 \times 10^5$ Pa, and the dynamic storage elastic modulus at 50° C. was $1.5 \times 10^5$ Pa, as measured at 6.28 rad/s.

(Fabrication of Silicone separator A/First Adhesive Layer/Silicone Separator B)

Silicone separator A ("SP-PETO5", 50 μm film thickness, product of Tokyo Cellophane, KK.) was coated with an adhesive solution having the composition listed above to an immediate dry film thickness of 15 μm using a comma coater, and this was laminated with silicone separator B ("SP-PETO2", 50 μm film thickness, product of Tokyo Cellophane, KK.).

The volume hologram laminate label was then fabricated in the same manner as Example A1.

After fabricating the volume hologram laminate in the same manner as Example A1 and visual examination of the hologram flaws after the same storage, spotty point flaws were found in the hologram, and the flaw level was 10.8, constituting a problem in terms of storage stability.

Example A2

Fabrication of Transparent Protective Film/Second Adhesive Layer/Silicone Separator A silicone separator ("SP-PETO5", 50 μm film thickness, product of Tokyo Cellophane, KK.) was coated with an adhesive solution having the following composition:

| Acrylic adhesive ("Nissetsu KP-977L", Nihon Carbide Co.) | 100 pts. by wt. |
|---|---|
| Methyl ethyl ketone | 30 pts. by wt. |
| Toluene | 15 pts. by wt. |
| Ethyl acetate | 15 pts. by wt. |

This was laminated with a polyethylene terephthalate film ("Lumira-T-60, 50 μm film thickness, product of Toray, KK.).

The dynamic storage elastic modulus of the adhesive layer at 25° C. was $7.9 \times 10^4$ Pa, and the dynamic storage elastic modulus at 50° C. was $3 \times 10^4$ Pa, as measured at 6.28 rad/s.

(Fabrication of Silicone Separator A/First Adhesive Layer/Silicone Separator B)

Silicone separator A ("SP-PETO5", 50 μm film thickness, product of Tokyo Cellophane, KK.) was coated with an adhesive solution having the composition listed above to an immediate dry film thickness of 15 μm using a comma coater, and this was laminated with silicone separator B ("SP-PETO2", 50 μm film thickness, product of Tokyo Cellophane, KK.).

The volume hologram laminate label was then fabricated in the same manner as Example A1.

After fabricating the volume hologram laminate in the same manner as Example A1 and visual examination of the hologram flaws after the same storage, the hologram flaw level was 0.25, thus demonstrating excellent storage stability.

Example A3

A volume hologram laminate label was fabricated in the same manner as Example A1, except that the acrylic adhesive ("Nissetsu PE-118", Nihon Carbide Co.) in the adhesive solution of Example A1 was changed to the acrylic adhesive ("Nissetsu PE-123", Nihon Carbide Co.), and the isocyanate-substrated crosslinking agent was used at 8 parts by weight.

Upon measuring the dynamic storage elastic modulus of the second adhesive layer at 6.28 rad/s in the same manner as Example A1, the dynamic storage elastic modulus at 25° C. was $1.7 \times 10^6$ Pa, and the dynamic storage elastic modulus at 50° C. was $8 \times 10^5$ Pa.

After fabricating the volume hologram laminate in the same manner as Example A1 and visual examination of the hologram flaws after the same storage, the hologram flaw level was 2.1, thus demonstrating excellent storage stability.

Example A4, Comparative Examples A2, A3

Volume hologram laminate labels were fabricated in the same manner as Example A1, except that the adhesive component in the adhesive solution and the amount of the isocyanate-substrated crosslinking agent in Example A1 were changed as listed in Table A1 below.

TABLE A1

| | Adhesive component | Isocyanate-substrated crosslinking agent amount |
|---|---|---|
| Comp. Ex. A2 | acrylic adhesive ("Nissetsu KP-1581", Nihon Carbide Co. | 0 pt. by wt. |
| Example A4 | acrylic adhesive ("Nissetsu KP-1581", Nihon Carbide Co. | 16 pts. by wt. |
| Comp. Ex. A3 | acrylic adhesive ("Nissetsu PE-118", Nihon Carbide Co. | 4 pts. by wt. |

The dynamic storage elastic modulus at 25° C. {E' (25° C.)} and the dynamic storage elastic modulus at 50 C. {E' (50° C.)} for each second adhesive layer were measured at 6.28 rad/s in the same manner as Example A1, giving the results listed in Table A2. Volume hologram laminates were also fabricated in the same manner as Example A1 and the hologram flaws were visually examined after the same storage, giving the results also listed in Table A2.

TABLE A2

| | E' (25° C.) (Pa) | E' (50° C.) (Pa) | Flaw level |
|---|---|---|---|
| Comp. Ex. A2 | $2.5 \times 10^5$ | $1 \times 10^5$ | 4.5 |
| Example A4 | $9.7 \times 10^6$ | $4.8 \times 10^6$ | 1.25 |
| Comp. Ex. A3 | $2.8 \times 10^5$ | $1.5 \times 10^5$ | 5.6 |

Figure 4:
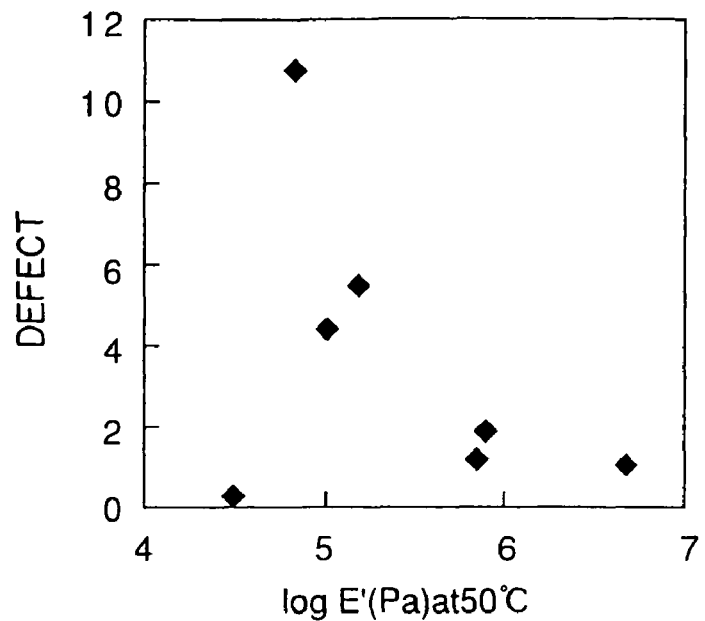
FIG. 4 shows the relationship between the level of hologram flaws and the dynamic storage elastic modulus of the second adhesive layer measured at 50° C. and 6.28 rad/s.

FIG. 4 shows the relationship between the level of hologram flaws and the dynamic storage elastic modulus of the second adhesive layer measured at 50° C. and 6.28 rad/s. Here it is seen that the flaw level is reduced when the dynamic storage elastic modulus of the second adhesive layer measured at 50° C. and 6.28 rad/s is $5 \times 10^4$ Pa or less, or $2.5 \times 10^5$ Pa or greater.

Reference Example A

A transparent protective film/second adhesive layer/silicone separator laminate and a silicone separator A/first adhesive layer/silicone separator B laminate were fabricated in the same manner as Comparative Example A1.

(Fabrication of Hologram Recording Film)

After recording a Lippmann hologram on a hologram recording film (Omnidex 706, product of DuPont) comprising a polyethylene terephthalate film (PET film: 50 μm)/hologram recording material layer (film thickness: 20 μm)/polyvinyl chloride film laminate using a 514 nm argon laser, the polyvinyl chloride film was peeled off, and that side was laminated with a color tuning film (CTF-75, product of DuPont) and heated at 100° C. for 15 minutes.

The glass transition point of the volume hologram layer was 42° C., and the dynamic storage elastic modulus at 50° C. when measured at 6.28 rad/s was $2.7 \times 10^6$ Pa.

The color tuning film was peeled off from the hologram recording film obtained above, the silicone separator A was peeled off from the silicone separator A/first adhesive layer/silicone separator B laminate obtained above, and the two were laminated together to obtain a PET film/hologram recording material/first adhesive layer/silicone separator B laminate.

The PET film was peeled off from this laminate, the silicone separator was peeled off from the transparent protective film/second adhesive layer/silicone separator laminate obtained above, and the two were laminated together to obtain a volume hologram laminate label according to the invention comprising a transparent protective film/second adhesive layer/hologram recording material/first adhesive layer/silicone separator B laminate. The spectral characteristics of the hologram were evaluated and the half-width of diffraction light was found to be 35 nm.

Next, the silicone separator B of the label was peeled off, and the label was attached to a sheet substrate and stored for 3 days under conditions of 50° C., 0.12 kg/cm².

The stored hologram was visually examined for hologram flaws under a triple beam fluorescent tube (Highlumic N FL4EX-N-PK: product of Hitachi Seisakusho), and no hologram flaws found.

The volume hologram laminate and volume hologram laminate-fabricating label according to the present invention have low generation of spotty hologram flaws in the volume hologram layer even when kept under pressurized conditions for storage.

Example B1

Fabrication of Transparent Protective Film/Second Adhesive Layer/Silicone Separator A silicone seperator ("SP-PETO5", 50 μm film thickness, product of Tokyo Cellophane, KK.) was coated with an adhesive solution having the following composition:

| | |
|---|---|
| Acrylic adhesive ("Nissetsu KP-977L", Nihon Carbide Co.) | 100 pts. by wt. |
| Methyl ethyl ketone | 30 pts. by wt. |

-continued

| | |
|---|---|
| Toluene | 15 pts. by wt. |
| Ethyl acetate | 15 pts. by wt. | to an immediate dry film thickness of 20 μm using a comma coater. This was laminated with a polyethylene terephthalate film ("Lumira-T-60, 50 μm film thickness, product of Toray, KK.).

FIG. 7 line (A) shows the frequency dependency of tan δ of the second adhesive layer at 25° C., and FIG. 8 line (A) shows the frequency dependency at 50° C.

(Fabrication of Silicone Separator A/First Adhesive Layer/Silicone Separator B)

Silicone separator A ("SP-PETO5", 50 μm film thickness, product of Tokyo Cellophane, KK.) was coated with an adhesive solution having the composition listed above to an immediate dry film thickness of 15 μm using a comma coater, and this was laminated with silicone separator B ("SP-PETO2", 50 μm film thickness, product of Tokyo Cellophane, KK.).

(Fabrication of Hologram Recording Film)

After recording a color Lippmann hologram on a hologram recording film (HRF 800×001, product of DuPont) comprising a polyethylene terephthalate film (PET film: 50 μm)/hologram recording material layer (film thickness: 15 μm)/PET film laminate using lasers with wavelengths of 476 nm, 532 nm and 647 nm, the PET film was peeled off, and the side was laminated with an adhesive sheet having a repeelable adhesive layer (H225E, product of Sanei Kaken, KK.) and heat treated at 120° C. for 24 minutes.

The glass transition point of the volume hologram layer was 46° C., and the dynamic storage elastic modulus at 50° C. when measured at 6.28 rad/s was $6.28 \times 10^6$ Pa.

(Fabrication of Hologram Laminate)

The repeelable adhesive sheet was peeled off from the hologram recorded film obtained above, after which the silicone separator A was peeled off from the silicone separator A/first adhesive layer/silicone separator B prepared above, and the two were laminated together to obtain a PET film/hologram recording material/first adhesive layer/silicone separator B laminate.

The PET film was peeled off from this laminate, the silicone separator was peeled off from the transparent protective film/second adhesive layer/silicone separator obtained above, and the two were laminated together to obtain a volume hologram laminate label according to the invention comprising the transparent protective film/second adhesive layer/hologram recording material/first adhesive layer/silicone separator B. The spectral characteristics of the hologram were evaluated and the half-width of diffraction lights were found to be 17-20 nm.

Next, the silicone separator B of the label was peeled off, and the label was attached to a sheet substrate and stored for 3 days under conditions of 50° C., 0.12 kg/cm².

The stored hologram was visually examined for hologram flaws under a triple-beam fluorescent tube (Highlumic N FL4EX-N-PK: product of Hitachi; peak wavelength: about 450 nm, 550 nm and 650 nm) at an angle where the flaws appeared darkest, and the hologram flaw level was 0.25, thus demonstrating excellent storage stability.

The flaw level was judged from a scale of 0 with absolutely no spotty hologram flaws, and the size (mm) and density (relatively value of 1-10) of the spots produced were determined visually and the product recorded as the flaw level. Samples with a flaw level of 3 or less were judged as having excellent storage stability.

The detailed meaning of the flaw level values are as follows:

0-3: Hologram flaw level is under the permissible level even by an examination with a triple-beam fluorescent tube. No flaw is observed under an ordinary fluorescent tube.

3-6: Flaws are slightly observed by an examination with a triple-beam fluores an ordinary fluorescent tube. The quality is within a marginal level. Hologram flaw level is under the permissible level under an ordinary fluorescent tube.

6-9: Flaws are aparently observed by an examination with a triple-beam fluorescent tube. Flaws are observed even under an ordinary fluorescent tube.

9 or more: Flaws are aparently observed both under a triple-beam fluorescent tube and an ordinary fluorescent tube.

Example B2

Fabrication of Transparent Protective Film/Second Adhesive Layer/Silicone Separator A silicone separator ("SP-PETO5", 50 μm film thickness, product of Tokyo Cellophane, KK.) was coated with an adhesive solution having the following composition:

| Acrylic adhesive ("Nissetsu PE-123", Nihon Carbide Co.) | 100 pts. by wt. |
| Methyl ethyl ketone | 30 pts. by wt. |
| Toluene | 15 pts. by wt. |
| Ethyl acetate | 15 pts. by wt. | to an immediate dry film thickness of 15 μm using a comma coater. This was laminated with a polyethylene terephthalate film ("Lumira-T-60, 50 μm film thickness, product of Toray, KK.).

FIG. 7 line (B) shows the frequency dependency of tan δ of the adhesive layer at 25° C., and FIG. 8 line (B) shows the frequency dependency at 50° C.

(Fabrication of Silicone Separator A/First Adhesive Layer/Silicone Separator B)

Silicone separator A ("SP-PETO5", 50 μm film thickness, product of Tokyo Cellophane, KK.) was coated with an adhesive solution having the composition listed above to an immediate dry film thickness of 15 μm using a comma coater, and this was laminated with silicone separator B ("SP-PETO2", 50 μm film thickness, product of Tokyo Cellophane, KK.).

The volume hologram laminate label was thereafter fabricated in the same manner as Example B1.

A volume hologram laminate was fabricated and visually examined for hologram flaws after storage in the same manner as Example B1, and the hologram flaw level was 1.3, thus demonstrating excellent storage stability.

Comparative Example B1

Fabrication of Transparent Protective Film/Second Adhesive Layer/Silicone Separator A transparent protective film/second adhesive layer/silicone separator laminate was fabricated in the same manner as Example B1, except that the silicone separator ("SP-PETO5", 50 μm film thickness, product of Tokyo Cellophane, KK.) was coated with the following composition:

| Acrylic adhesive ("Nissetsu PE-118", Nihon Carbide Co.) | 100 pts. by wt. |
| Methyl ethyl ketone | 30 pts. by wt. |
| Toluene | 15 pts. by wt. |
| Ethyl acetate | 15 pts. by wt. |

FIG. 7 line (C) shows the frequency dependency of tan δ of the adhesive layer at 25° C.

(Fabrication of Silicone Separator A/First Adhesive Layer/Silicone Separator B)

Silicone separator A ("SP-PETO5", 50 μm film thickness, product of Tokyo Cellophane, KK.) was coated with an adhesive solution having the composition listed above to an immediate dry film thickness of 15 μm using a comma coater, and this was laminated with silicone separator B ("SP-PETO2", 50 μm film thickness, product of Tokyo Cellophane, KK.).

The volume hologram laminate label was thereafter fabricated in the same manner as Example B1.

After fabricating the volume hologram laminate in the same manner as Example B1 and visual examination of the hologram flaws after the same storage, spotty point flaws were found in the hologram, and the flaw level was 10.8, constituting a problem in terms of storage stability.

Reference Example B

A transparent protective film/second adhesive layer/silicone separator laminate and a silicone separator A/first adhesive layer/silicone separator B laminate were fabricated in the same manner as Comparative Example B1.

(Fabrication of Hologram Recording Film)

After recording a Lippmann hologram on a hologram recording film (Omnidex 706, product of DuPont) comprising a polyethylene terephthalate film (PET film: 50 μm)/hologram recording material layer (film thickness: 20 μm)/polyvinyl chloride film laminate using a 514 nm argon laser, the polyvinyl chloride film was peeled off, and that side was laminated with a color tuning film (CTF-75, product of DuPont) and heated at 100° C. for 15 minutes.

The glass transition point of the volume hologram layer was 42° C., and the dynamic storage elastic modulus at 50° C. when measured at 6.28 rad/s was $2.7 \times 10^6$ Pa.

(Fabrication of Hologram Laminate)

The color tuning film was peeled off from the hologram recording film obtained above, the silicone separator A was peeled off from the silicone separator A/first adhesive layer/silicone separator B laminate obtained above, and the two were laminated together to obtain a PET film/hologram recording material/first adhesive layer/silicone separator B laminate.

The PET film was peeled off from this laminate, the silicone separator was peeled off from the transparent protective film/second adhesive layer/silicone separator laminate obtained above, and the two were laminated together to obtain a volume hologram laminate label according to the invention comprising a transparent protective film/second adhesive layer/hologram recording material/first adhesive layer/silicone separator B laminate. The spectral characteristics of the hologram were evaluated and the half-width of diffraction lights were found to be 35 nm.

Next, the silicone separator B of the label was peeled off, and the label was attached to a sheet substrate and stored for 3 days under conditions of 50° C., 0.12 kg/cm$^2$.

The stored hologram was visually examined for hologram flaws under a triple-beam fluorescent tube (Highlumic N FL4EX-N-PK: product of Hitachi; peak wavelength: about 450 nm, 550 nm and 650 nm), and no hologram flaws were found.

The volume hologram laminate and volume hologram laminate-fabricating label according to the present invention can minimize generation of spotty hologram flaws in the volume hologram layer even when kept under pressurized conditions for storage.

Example C1

Fabrication of Transparent Protective Film/Second Adhesive Layer/Silicone Separator A silicone separator ("SP-PETO5", 50 μm film thickness, product of Tokyo Cellophane, KK.) was coated with an adhesive solution having the following composition:

| | |
|---|---|
| Acrylic adhesive ("Nissetsu PE-118", Nihon Carbide Co.) | 100 pts. by wt. |
| Methyl ethyl ketone | 30 pts. by wt. |
| Toluene | 15 pts. by wt. |
| Ethyl acetate | 15 pts. by wt. |
| Isocyanate-substrated crosslinking agent ("Nissetsu CK-101", Nihon Carbide Co.) | 16 pts. by wt. | to an immediate dry film thickness of 15 μm using a comma coater. This was laminated with a polyethylene terephthalate film ("Lumira-T-60, 50 μm film thickness, product of Toray, KK.).

Measurement of the surface viscoelasticity of the adhesive layer gave a maximum logarithmic decrement of 0.442.

(Fabrication of Silicone Separator A/First Adhesive Layer/Silicone Separator B)

Silicone separator A ("SP-PETO5", 50 μm film thickness, product of Tokyo Cellophane, KK.) was coated with an adhesive solution having the composition listed above to an immediate dry film thickness of 15 μm using a comma coater, and this was laminated with silicone separator B ("SP-PETO2", 50 μm film thickness, product of Tokyo Cellophane, KK.).

(Fabrication of Hologram Recording Film)

After recording a color Lippmann hologram on a hologram recording film (HRF 800×001, product of DuPont) comprising a polyethylene terephthalate film (PET film: 50 μm)/hologram recording material layer (film thickness: 15 μm)/PET film laminate using lasers with wavelengths of 476 nm, 532 nm and 647 nm, the PET film was peeled off, and the side was laminated with an adhesive sheet having a repeelable adhesive layer (H225E, product of Sanei Kaken, KK.) and heat treated at 120° C. for 24 minutes.

The glass transition point of the volume hologram layer was 46° C., and the dynamic storage elastic modulus at 50° C. when measured at 6.28 rad/s was 6.28×10$^6$ Pa.

(Fabrication of Hologram Laminate)

The repeelable adhesive sheet was peeled off from the hologram recorded film obtained above, after which the silicone separator A was peeled off from the silicone separator A/first adhesive layer/silicone separator B prepared above, and the two were laminated together to obtain a PET film/hologram recording material/first adhesive layer/silicone separator B laminate.

The PET film was peeled off from this laminate, the silicone separator was peeled off from the transparent protective film/second adhesive layer/silicone separator obtained above, and the two were laminated together to obtain a volume hologram laminate label according to the invention comprising the transparent protective film/second adhesive layer/hologram recording material/first adhesive layer/silicone separator B. The spectral characteristics of the hologram were evaluated and the half-width of diffraction lights were found to be 17-20 nm.

Next, the silicone separator B of the label was peeled off, and the label was attached to a sheet substrate and stored for 3 days under conditions of 50° C., 0.12 kg/cm$^2$.

The stored hologram was visually examined for hologram flaws under a triple-beam fluorescent tube (Highlumic N FL4EX-N-PK: product of Hitachi; peak wavelength: about 450 nm, 550 nm and 650 nm) at an angle where the flaws appeared darkest, and the hologram flaw level was 1.5, thus demonstrating excellent storage stability.

The flaw level was judged from a scale of 0 with absolutely no spotty hologram flaws, and the size (mm) and density (relatively value of 1-10) of the spots produced were determined visually and the product recorded as the flaw level. Samples with a flaw level of 3 or less were judged as having excellent storage stability.

The detailed meaning of the flaw level values are as follows:

0-3: Hologram flaw level is under the permissible level even by an examination with a triple-beam fluorescent tube. No flaw is observed under an ordinary fluorescent tube.

3-6: Flaws are slightly observed by an examination with a triple-beam fluores an ordinary fluorescent tube. The quality is within a marginal level. Hologram flaw level is under the permissible level under an ordinary fluorescent tube.

6-9: Flaws are aparently observed by an examination with a triple-beam fluorescent tube. Flaws are observed even under an ordinary fluorescent tube.

9 or more: Flaws are aparently observed both under a triple-beam fluorescent tube and an ordinary fluorescent tube.

Comparative Example C1

Fabrication of Transparent Protective Film/Second Adhesive Layer/Silicone Separator A transparent protective film/second adhesive layer/silicone separator laminate was fabricated in the same manner as Example C1, except that the silicone separator ("SP-PETO5", 50 μm film thickness, product of Tokyo Cellophane, KK.) was coated with the following composition:

| | |
|---|---|
| Acrylic adhesive ("Nissetsu PE-118", Nihon Carbide Co.) | 100 pts. by wt. |
| Methyl ethyl ketone | 30 pts. by wt. |
| Toluene | 15 pts. by wt. |
| Ethyl acetate | 15 pts. by wt. |

Measurement of the surface viscoelasticity of the adhesive layer in the same manner as Example C1 gave a maximum logarithmic decrement of 1.4.

(Fabrication of Silicone Separator A/First Adhesive Layer/Silicone Separator B)

Silicone separator A ("SP-PETO5", 50 μm film thickness, product of Tokyo Cellophane, KK.) was coated with an adhesive solution having the composition listed above to an immediate dry film thickness of 15 μm using a comma coater, and this was laminated with silicone separator B ("SP-PETO2", 50 μm film thickness, product of Tokyo Cellophane, KK.).

The volume hologram laminate label was thereafter fabricated in the same manner as Example C1.

After fabricating the volume hologram laminate in the same manner as Example C1 and visual examination of the hologram flaws after the same storage, spotty point flaws were found in the hologram, and the flaw level was 10.8, constituting a problem in terms of storage stability.

Example C2

Fabrication of Transparent Protective Film/Second Adhesive Layer/Silicone Separator A silicone separator ("SP-PETO5", 50 μm film thickness, product of Tokyo Cellophane, KK.) was coated with an adhesive solution having the following composition:

| | |
|---|---|
| Acrylic adhesive ("Nissetsu KP-977L", Nihon Carbide Co.) | 100 pts. by wt. |
| Methyl ethyl ketone | 30 pts. by wt. |
| Toluene | 15 pts. by wt. |
| Ethyl acetate | 15 pts. by wt. | to an immediate dry film thickness of 20 μm using a comma coater. This was laminated with a polyethylene terephthalate film ("Lumira-T-60, 50 μm film thickness, product of Toray, KK.).

Measurement of the surface viscoelasticity of the adhesive layer gave a maximum logarithmic decrement of 2.8.

(Fabrication of Silicone Separator A/First Adhesive Layer/Silicone Separator B)

Silicone separator A ("SP-PETO5", 50 μm film thickness, product of Tokyo Cellophane, KK.) was coated with an adhesive solution having the composition listed above to an immediate dry film thickness of 15 μm using a comma coater, and this was laminated with silicone separator B ("SP-PETO2", 50 μm film thickness, product of Tokyo Cellophane, KK.).

The volume hologram laminate label was thereafter fabricated in the same manner as Example C1.

After fabricating the volume hologram laminate in the same manner as Example C1 and visual examination of the hologram flaws after the same storage, the hologram flaw level was 0.25, thus demonstrating excellent storage stability.

Example C3

A volume hologram laminate label was fabricated in the same manner as Example C1, except that the acrylic adhesive ("Nissetsu PE-118", Nihon Carbide Co.) in the adhesive solution of Example C1 was changed to the acrylic adhesive ("Nissetsu PE-123", Nihon Carbide Co.), and the isocyanate-substrated crosslinking agent was used at 8 parts by weight.

Measurement of the surface viscoelasticity of the second adhesive layer gave a maximum logarithmic decrement of 0.776.

After fabricating the volume hologram laminate in the same manner as Example C1 and visual examination of the hologram flaws after the same storage, the hologram flaw level was 2.1, thus demonstrating excellent storage stability.

Example C4, Comparative Examples C2, C3

Volume hologram laminate labels were fabricated in the same manner as Example C1, except that the adhesive component in the adhesive solution and the amount of the isocyanate-substrated crosslinking agent in Example C1 were changed as listed in Table C1 below.

TABLE C1

| | Adhesive component | Isocyanate-substrated crosslinking agent amount |
|---|---|---|
| Comp. Ex. C2 | acrylic adhesive ("Nissetsu KP-1581", Nihon Carbide Co. | 0 pt. by wt. |
| Example C4 | acrylic adhesive ("Nissetsu KP-1581", Nihon Carbide Co. | 16 pts. by wt. |
| Comp. Ex. C3 | acrylic adhesive ("Nissetsu PE-118", Nihon Carbide Co. | 4 pts. by wt. |

The maximum logarithmic decrement (Δmax) of the surface viscoelasticity of each second adhesive layer was measured in the same manner as Example C1, giving the results listed in Table C2. Volume hologram laminates were also fabricated in the same manner as Example C1 and the hologram flaws were visually examined after the same storage, giving the results also listed in Table C2.

TABLE C2

| | Δmax | Flaw level |
|---|---|---|
| Comp. Ex. C2 | 1.9 | 4.5 |
| Example C4 | 0.23 | 1.25 |
| Comp. Ex. C3 | 1.93 | 5.6 |

Reference Example C

A transparent protective film/second adhesive layer/silicone separator laminate and a silicone separator A/first adhesive layer/silicone separator B laminate were fabricated in the same manner as Comparative Example C1.

(Fabrication of Hologram Recording Film)

After recording a Lippmann hologram on a hologram recording film (Omnidex 706, product of DuPont) comprising a polyethylene terephthalate film (PET film: 50 μm)/hologram recording material layer (film thickness: 20 μm)/polyvinyl chloride film laminate using a 514 nm argon laser, the polyvinyl chloride film was peeled off, and that side was laminated with a color tuning film (CTF-75, product of DuPont) and heated at 100° C. for 15 minutes.

The glass transition point of the volume hologram layer was 42° C., and the dynamic storage elastic modulus at 50° C. when measured at 6.28 rad/s was $2.7 \times 10^6$ Pa.

(Fabrication of Hologram Laminate)

The color tuning film was peeled off from the hologram recording film obtained above, the silicone separator A was peeled off from the silicone separator A/first adhesive layer/silicone separator B laminate obtained above, and the two were laminated together to obtain a PET film/hologram recording material/first adhesive layer/silicone separator B laminate.

The PET film was peeled off from this laminate, the silicone separator was peeled off from the transparent protective film/second adhesive layer/silicone separator laminate obtained above, and the two were laminated together to obtain a volume hologram laminate label according to the invention comprising a transparent protective film/second adhesive layer/hologram recording material/first adhesive layer/silicone separator B laminate. The spectral characteristics of the hologram were evaluated and the half-width of diffraction lights were found to be 35 nm.

Next, the silicone separator B of the label was peeled off, and the label was attached to a sheet substrate and stored for 3 days under conditions of 50° C., 0.12 kg/cm².

The stored hologram was visually examined under a triple-beam fluorescent tube (Highlumic N FL4EX-N-PK: product of Hitachi; peak wavelength: about 450 nm, 550 nm and 650 nm), and no hologram flaws were found.

Figure 12:
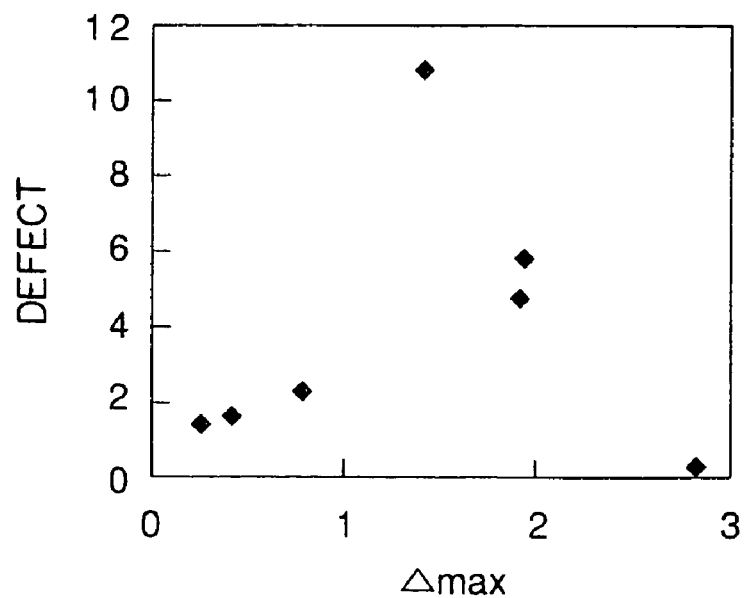
FIG. 12 shows the relationship between the level of hologram flaws and the maximam logarithmic decrement (Δmax) obtained by measurement of the surface viscoelasticity of the second adhesive layer.

FIG. 12 shows the relationship between the level of hologram flaws and the maximum logarithmic decrement (Δmax) obtained by measurement of the surface viscoelasticity of the second adhesive layer. Here it is seen that the flaw level is reduced when the second adhesive layer has a maximum logarithmic decrement of less than 1 or at least 2, as obtained by measurement of the surface viscoelasticity in a pendulum type rigidity test.

The volume hologram laminate and volume hologram laminate-fabricating label according to the present invention have low generation of spotty hologram flaws in the volume hologram layer even when kept under pressurized conditions for storage.

Example D1

Fabrication of Hologram Recorded Layer

After recording a color Lippmann hologram on a hologram recording film (HRF 800×001, product of DuPont) comprising a PET film/hologram recording material layer/PET film laminate using lasers with wavelengths of 476 nm, 532 nm and 647 nm, the PET film was peeled off, and the peeled side was laminated with a repeelable adhesive (H225E, product of Sanei Kaken, KK.) and heat treated at 120° C. for 24 minutes.

The glass transition point of the volume-type hologram layer was 46° C., and the dynamic storage elastic modulus at 50° C. when measured at 6.28 rad/s was 6.28×10⁶ Pa.

(Fabrication of Hologram Laminate)

The repeelable adhesive was peeled off from the hologram recorded layer obtained above, after which the separator was peeled off from one side of an acrylic double-sided adhesive (PET50(w)PL Shin PET38, product of Lintech) and the two were laminated together to obtain a [PET/hologram layer/black PET/adhesive layer/separator] laminate.

The PET film was peeled off from this laminate, and a hot-melt adhesive film (Hirodyne: PET38/7504) was laminated thereon at 120° C. to obtain a volume hologram laminate comprising the [PET/hot-melt adhesive layer/hologram layer/adhesive layer/black PET/adhesive layer/separator]. The spectral characteristics of the hologram were evaluated and the half-width at each diffraction peak was found to be 13-17 nm.

The silicone separator of the hologram laminate obtained above was peeled off and attached to a sheet substrate. This was stored for 3 days under conditions of 50° C., 0.2 kg/cm² and then visually examined for hologram flaws under a triple-beam fluorescent tube (Highlumic N FL4EX-N-PK: product of Hitachi; peak wave length: about 450 nm, 550 nm and 650 nm) at an angle where the flaws appeared darkest, upon which the hologram flaw level was 0.2, thus demonstrating excellent storage stability.

(Fabrication of Hologram Recorded Layer)

The volume-type hologram laminate according to the present invention has low generation of spotty hologram flaws in the volume hologram-type layer even when kept under heated and pressurized conditions during storage.

What is claimed is:

1. A volume hologram laminate, comprising a transparent protective film formed on a front surface of a volume hologram layer via a transparent hot-melt adhesive layer having a glass transition point within the range not exceeding a heat sealing temperature of 90-180° C., wherein:
    (1) a half-width of diffraction light in the volume hologram layer is no greater than 30 nm;
    (2) a glass transition point of a resin forming the volume hologram layer is 30-70° C.;
    (3) the resin forming the volume hologram layer has a dynamic storage elastic modulus of $10^8$-$10^{10}$ Pa at 25° C., or a dynamic storage elastic modulus of $5\times10^5$-$5\times10^7$ Pa at 50° C., when measured at 6.28 rad/sec; and
    (4) said volume hologram laminate has a spotty hologram level of 3 or less according to the following conditions:
        the volume hologram laminate is stored for 3 days under conditions of 50° C. and 0.12 kg/cm²,
        the stored volume hologram laminate is visually examined in a triple-beam fluorescent tube at an angle where flaws appeared darkest, and
        a flaw level is judged from a scale of 0 with absolutely no spotty hologram flaws, and the size (mm) and density (relative value of 1-10) of the spots are multiplied to define the spotty level.

2. A volume hologram laminate according to claim 1, further comprising:
    a transparent or colored adhesive layer formed on a back surface of the volume hologram layer; and
    a substrate formed on a back surface of the transparent or colored adhesive layer.

3. A volume hologram laminate according to claim 1, further comprising:
    an adhesive layer formed on a back surface of the volume hologram layer;
    a transparent or colored film formed on a back surface of the adhesive layer;
    an adhesive or hot-melt adhesive layer formed on a back surface of the transparent or colored film; and
    a substrate formed on a back surface of the adhesive or hot-melt adhesive layer.

4. A volume hologram laminate according to claim 1, further comprising:
    an adhesive layer or hot-melt adhesive layer formed on a back surface of the volume hologram layer; and
    a transparent or colored film formed on a back surface of the adhesive layer or hot-melt adhesive layer.

5. A volume hologram laminate according to claim 2, wherein the substrate is a releasable film.

6. A volume hologram laminate, comprising a transparent protective film formed on a front surface of a volume hologram layer via a transparent hot-melt adhesive layer having a glass transition point within the range not exceeding a heat sealing temperature and having a thickness of 2-30 μm, wherein:
    (1) a half-width of diffraction light in the volume hologram layer is no greater than 30 nm;

(2) a glass transition point of a resin forming the volume hologram layer is 30-70° C.;

(3) the resin forming the volume hologram layer has a dynamic storage elastic modulus of $10^8$-$10^{10}$ Pa at 25° C., or a dynamic storage elastic modulus of $5\times10^5$-$5\times10^7$ Pa at 50° C., when measured at 6.28 rad/sec; and (4) said volume hologram laminate has a spotty hologram level of 3 or less according to the following conditions:

the volume hologram laminate is stored for 3 days under conditions of 50° C. and 0.12 kg/cm$^2$, the stored volume hologram laminate is visually examined in a triple-beam fluorescent tube at an angle where flaws appeared darkest, and a flaw level is judged from a scale of 0 with absolutely no spotty hologram flaws, and the size (mm) and density (relative value of 1-10) of the spots are multiplied to define the spotty level.

7. A volume hologram laminate according to claim 6, further comprising:

a transparent or colored adhesive layer formed on a back surface of the volume hologram layer; and a substrate formed on a back surface of the transparent or colored adhesive layer.

8. A volume hologram laminate according to claim 6, further comprising:

an adhesive layer formed on a back surface of the volume hologram layer;

a transparent or colored film formed on a back surface of the adhesive layer;

an adhesive or hot-melt adhesive layer formed on a back surface of the transparent or colored film; and a substrate formed on a back surface of the adhesive or hot-melt adhesive layer.

9. A volume hologram laminate according to claim 6, further comprising:

an adhesive layer or hot-melt adhesive layer formed on a back surface of the volume hologram layer; and a transparent or colored film formed on a back surface of the adhesive layer or hot-melt adhesive layer.

10. A volume hologram laminate according to claim 7, wherein the substrate is a releasable film.

* * * * *